United States Patent [19]

Takishima

[11] Patent Number: 5,592,447
[45] Date of Patent: Jan. 7, 1997

[54] CONTROL DEVICE FOR HEAD UNIT HAVING OPTICAL HEAD AND MULTIPLE MAGNETIC HEADS

[75] Inventor: Suguru Takishima, Tokyo, Japan

[73] Assignee: Asahi Kogaku Kogyo Kabushiki Kaisha, Tokyo, Japan

[21] Appl. No.: 539,763

[22] Filed: Oct. 6, 1995

Related U.S. Application Data

[62] Division of Ser. No. 383,379, Feb. 3, 1995, Pat. No. 5,513,159, which is a division of Ser. No. 43,823, Apr. 7, 1993, Pat. No. 5,408,455.

[30] Foreign Application Priority Data

Apr. 8, 1992 [JP] Japan .................................. 4-086831

[51] Int. Cl.⁶ .................................................. G11B 7/095
[52] U.S. Cl. ............................ 369/44.27; 369/54; 369/58
[58] Field of Search ........................ 369/13, 44.25, 369/44.27, 44.32, 44.39, 48, 50, 54, 58, 110, 111, 215, 219, 291

[56] References Cited

U.S. PATENT DOCUMENTS

| | | | |
|---|---|---|---|
| 4,962,494 | 10/1990 | Kimura | 369/48 |
| 5,078,471 | 1/1992 | Takishima | 369/44.16 X |
| 5,191,562 | 3/1993 | Hensing et al. | 369/215 X |
| 5,191,570 | 3/1993 | Shirai | 369/44.22 |
| 5,297,114 | 3/1994 | Itoh et al. | 369/44.32 |
| 5,309,423 | 5/1994 | Noguchi et al. | 369/110 |
| 5,321,550 | 6/1994 | Maruyama et al. . | |
| 5,406,532 | 4/1995 | Nishikawa . | |
| 5,408,455 | 4/1995 | Takishima | 369/44.32 |

FOREIGN PATENT DOCUMENTS

| | | |
|---|---|---|
| 0407191 | 1/1991 | European Pat. Off. . |
| 64-89054 | 4/1989 | Japan . |
| 3-40250 | 2/1991 | Japan . |
| 3-263639 | 11/1991 | Japan . |

OTHER PUBLICATIONS

Patent Abstracts of Japan, vol. 18, No. 587, (P1824), Nov. 10, 1994 & JP 6-215434.
Patent Abstracts of Japan, vol. 16, No. 502, (P1438), Oct. 16, 1992 & JP 4-181535.

*Primary Examiner*—W. R. Young
*Attorney, Agent, or Firm*—Greenblum & Bernstein P.L.C.

[57] ABSTRACT

A head unit control device comprising an optical head unit for radiating a laser beam onto a magneto-optical disc, a magnetic head unit including a floating magnetic head and a fixed magnetic head. Luminous flux is radiated onto the magnetic head unit and the optical head unit. The luminous flux reflected by these units is sensed by photo detectors, so that a relative position error signal is generated by a sensing circuit. When information is overwritten onto the magneto-optical disc on which information has been already recorded, the floating magnetic head is moved in synchronization with the optical head, based on the relative position error signal. When information is recorded on the magneto-optical disc on which information has not been recorded, the fixed magnetic head is moved in synchronization with the optical head, based on the relative position error signal.

3 Claims, 24 Drawing Sheets

CONTROL DEVICE FOR HEAD UNIT HAVING OPTICAL HEAD AND MULTIPLE MAGNETIC HEADS

This application is a division of application No. 08/383,379, filed Feb. 3, 1995, now U.S. Pat. No. 5,513,159, which is a division of application No. 08/043,823 filed Apr. 7, 1993, now U.S. Pat. No. 5,408,455.

BACKGROUND OF THE INVENTION

1. Field of the Invention

The present invention relates to a device for controlling head units provided in a magneto-optical recording-reproduction device by which information is recorded on a magneto-optical disc, information recorded on the magneto-optical disc being reproduced, or being erased from the magneto-optical disc.

2. Description of the Related Art

In a magneto-optical disc used in a magneto-optical recording-reproduction device, a 5.25 inch double sided type magneto-optical disc is known in which information can be recorded on two surfaces of the disc, the information recorded on the two surfaces can be erased, and can be reproduced, according to ISO (International Organization for Standardization) standards. The erasing, recording and reproducing operations on the magneto-optical disc are carried out by a magneto-optical recording-reproduction device having a fixed magnetic head generating a bias magnetic field, and an optical head.

In this kind of magneto-optical disc, a known method of recording, reproduction and erasing of information on a magneto-optical disc can be carried out by magnetic field modulation. According to a recording operation by the magnetic field modulation method, new information can be easily overwritten on a track on which old information has been stored. The magneto-optical recording-reproduction device, which can overwrite information on the magneto-optical disc, has an optical head for radiating a laser beam onto the magneto-optical disc to record information on the magneto-optical disc and reproduce the information, and a fixed magnetic head imposing a modulated magnetic field on the magneto-optical disc to overwrite information on the magneto-optical disc.

When reproducing information stored on the magneto-optical disc, the magneto-optical recording-reproduction device radiates a laser beam onto the magneto-optical disc from the optical head, and receives the beam reflected from the magneto-optical disc by a photo detector. When overwriting information on the magneto-optical disc, the magneto-optical recording-reproduction device imparts a modulated magnetic field for recording the information, onto a point of the magneto-optical disc onto which the laser beam is also radiated from the optical head.

In the magneto-optical recording-reproduction device using the magnetic field modulation method, there is a device in which a floating magnetic head is provided as the magnetic head. By using this floating magnetic head, information can be recorded on the magneto-optical disc with high density.

The magneto-optical disc used in the magneto-optical recording-reproduction device having the floating magnetic head is a single sided type magneto-optical disc on which information can be overwritten only on one surface of the disc, which is different from the double side type magneto-optical disc for which the fixed magnetic head is used. This is due to a construction in which the floating magnetic head needs to be brought close to the magneto-optical disc.

Accordingly, even when the double-sided type magneto-optical disc is mounted in the magneto-optical recording-reproduction device in which the floating magnetic head is provided, information cannot be recorded on the double sided type magneto-optical disc.

SUMMARY OF THE INVENTION

Therefore, an object of the present invention is to provide a head unit control device by which information can be overwritten onto a single sided type magneto-optical disc, and information can be recorded on a double sided type magneto-optical disc.

According to the present invention, a head unit control device is provided in a magneto-optical record device, comprising an optical head unit, a magnetic head unit, a radiating mechanism, and a control mechanism.

The optical head unit radiates a laser beam onto a magneto-optical disc, and moves relative to the magneto-optical disc. The magnetic head unit moves synchronously with the optical head unit, and has a first magnetic head and a second magnetic head. The radiating mechanism radiates a luminous flux to the optical head unit and the magnetic head unit. The luminous flux is reflected by the optical head unit and the magnetic head unit. The control mechanism controls the optical head unit and the magnetic head unit based on the luminous flux reflected from the optical head unit and the magnetic head unit, whereby one of the first and second magnetic heads is moved while maintaining a predetermined positional relationship with the optical head unit.

Further, according to the present invention, there is provided a magneto-optical record device, comprising an optical head unit, a magnetic head unit, a radiating unit, reflecting portions, and a sensing unit.

The optical head unit radiates a laser beam onto a magneto-optical disc. The magnetic head unit moves synchronously with the optical head unit, and includes a plurality of magnetic heads which have functions that differs from each other. The radiating unit is provided for radiating luminous flux onto the optical head unit and the magnetic head unit to sense positions of the optical head unit and the magnetic head unit. The reflecting portions are provided on the optical head unit and the magnetic head unit to reflect the luminous flux radiated from the radiating unit. The sensing unit generates a relative position error signals based on a reflected luminous flux from the optical head unit and the magnetic head unit, so that each of the magnetic heads is moved synchronously with the optical head unit, when information is recorded on the magneto-optical disc by each of the magnetic heads.

Furthermore, according to the present invention, a head unit control device is provided in a magneto-optical recording device, comprising an optical head unit, a magnetic head unit, a radiating mechanism, a generating mechanism, and a control mechanism.

The optical head unit radiates a laser beam onto a magneto-optical disc, and moves in a direction of the magneto-optical disc. The magnetic head unit moves in a direction of the magneto-optical disc and in synchronization with the optical head unit so as to be positioned at the relative position where the optical head unit is located. The magnetic head unit has a floating magnetic head and a fixed magnetic head. The radiating mechanism radiates a luminous flux to the optical head unit and the magnetic head unit. The generating mechanism generates a relative position error signal, based on a reflected luminous flux from the optical head unit and the magnetic head unit. The control mechanism controls the optical head unit and the magnetic head unit based on the relative postion error signal, whereby one of the floating magnetic head and the fixed magnetic head is moved to maintain a constant positional relationship with the optical head unit.

Further, according to the present invention, there is provided a device for selecting a magnetic head to be operated together with an optical head to record or reproduce a signal on a magneto-optical disc, comprising a first magnetic head and a second magnetic head, a carriage, a determining mechanism, and a control mechanism.

The first magnetic head and the second magnetic head have different functions from each other, and are arranged along the radial direction of the magneto-optical disc. The carriage is movable along the radial direction of the magneto-optical disc, and carries the first and second magnetic heads. The determining mechanism determines which type of magneto-optical disc is in use. The control mechanism controls the position of the carriage based on the type of magneto-optical disc determined by the determining mechanism, whereby the position of the carriage is controlled so that the first or second magnetic head faces the optical head.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
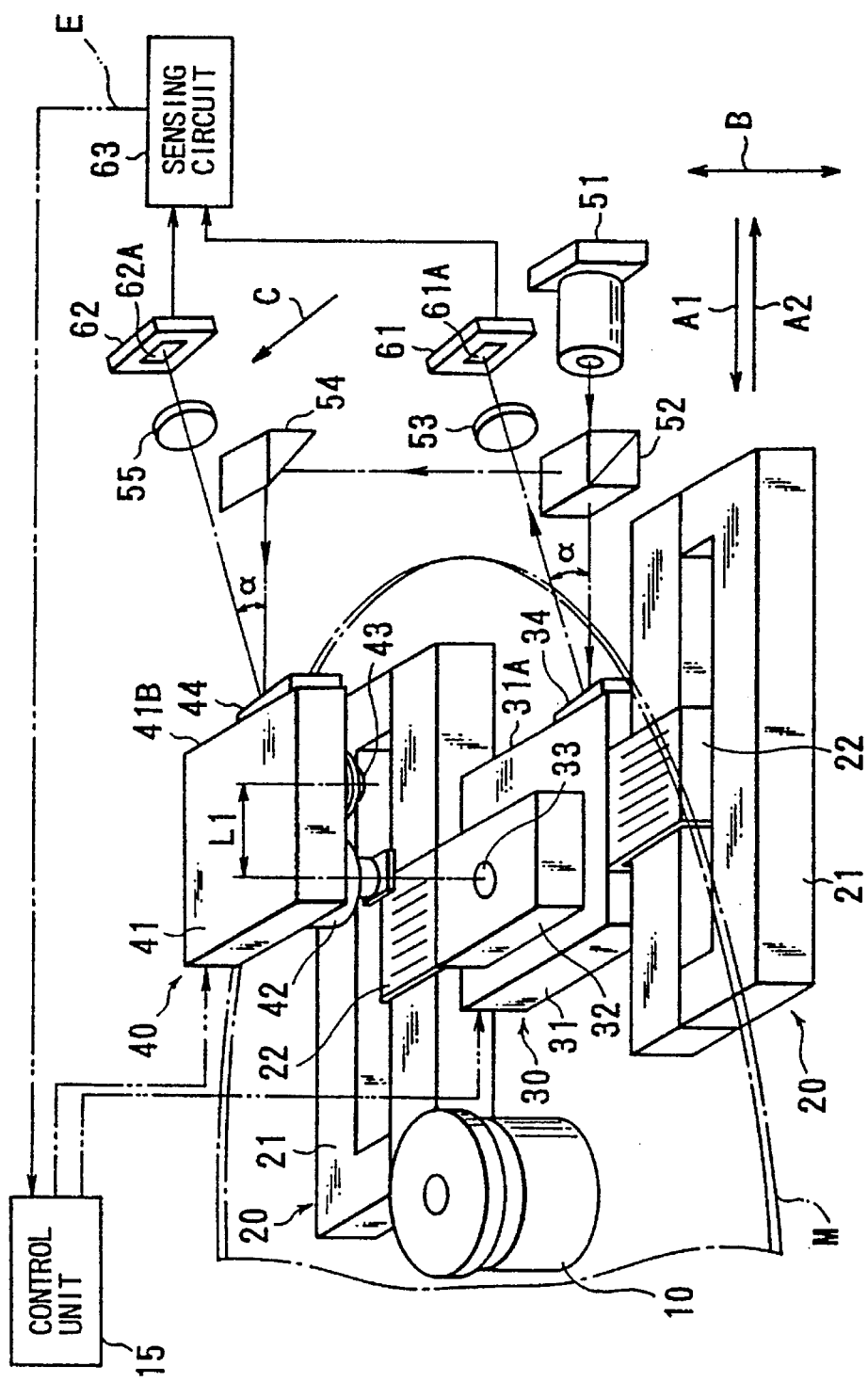
FIG. 1 is a perpendicular view showing a first embodiment in a state in which an overwriting operation is carried out by an optical head and a floating magnetic head.

The present invention will now be described with reference to embodiments shown in the drawings.

Figure 2:
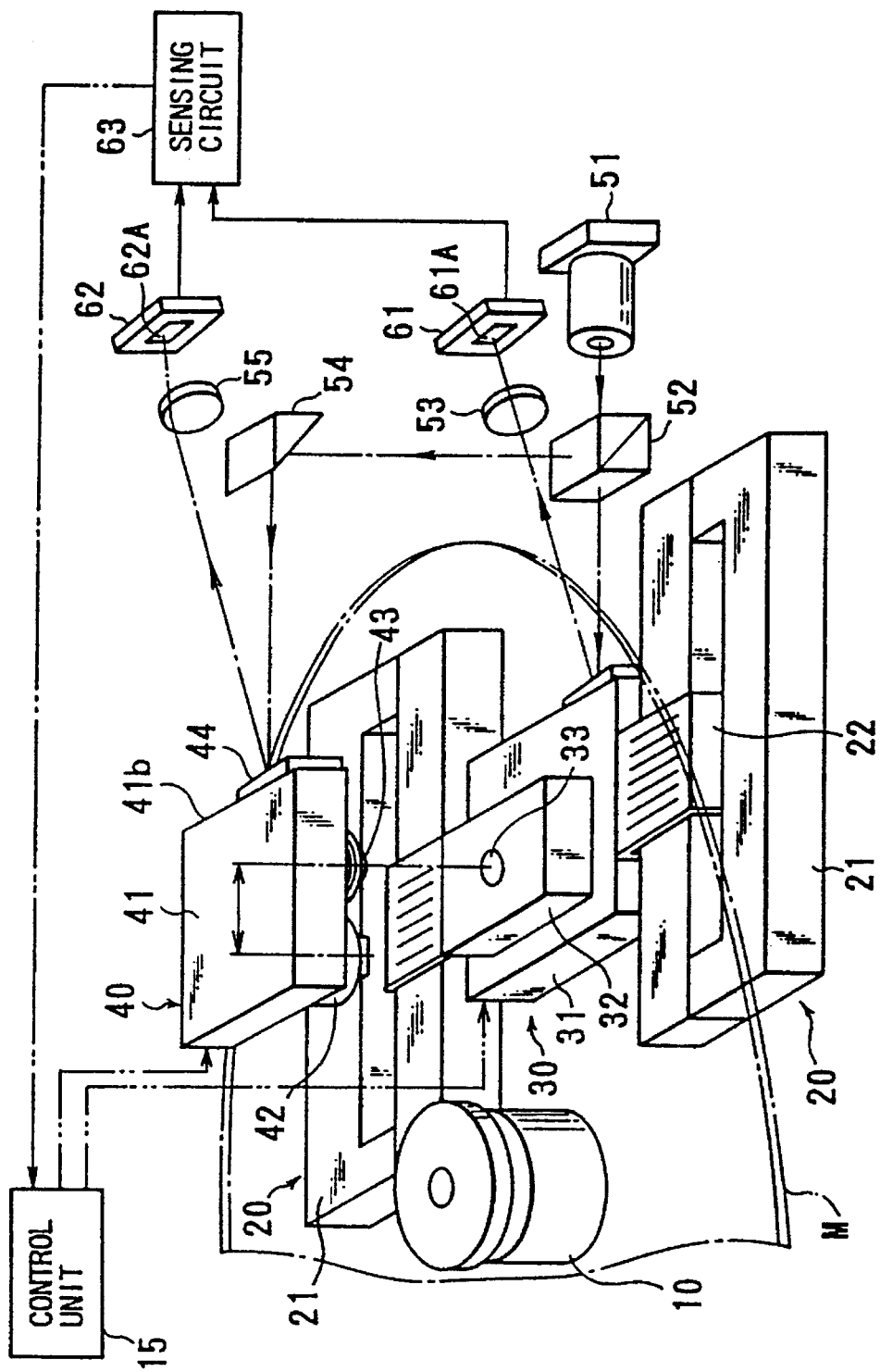
FIG. 2 is a perpendicular view showing the first embodiment in a state in which a recording operation is carried out by the optical head and a fixed magnetic head.

FIGS. 1 and 2 show a first embodiment of a magneto-optical recording-reproduction device according to the present invention. In this device, a magneto-optical disc M housed in a cartridge case (not shown) is used. The magneto-optical disc M may be a 5.25 inch diameter single sided type magneto-optical disc, or a 5.25 inch diameter double sided type magneto-optical disc.

The magneto-optical recording-reproduction device is provided with a spindle motor 10 for rotating the magneto-optical disc M.

Linear motors 20, 20 and an optical head unit 30 are provided at one side of the magneto-optical disc M, and a magnetic head unit 40 is provided at the other side of the magneto-optical disc M. Namely, the magnetic head unit 40 is disposed at a position opposite to the optical head unit 30 about the magneto-optical disc M. The optical head unit 30 and the magnetic head unit 40 are movable relative to the magneto-optical disc M.

The linear motors 20, 20 have linear motor magnets 21, 21, which are disposed separately from each other in such a manner that the longitudinal direction of each of the linear motor magnets 21, 21 is parallel to the radial directions A1, A2 of the magneto-optical disc M. The linear motors 20, 20 have optical head moving coils 22, 22, which are provided on the linear motor magnets 21, 21 to be movable in the radial directions A1, A2. The optical head moving coils 22, 22 are moved in the radial directions A1, A2 when electric current is applied thereto.

The optical head unit 30 has an optical head carriage 31 provided between the optical head moving coils 22, 22. The optical head unit 30 has an optical head 32, which is held on the optical head carriage 31. The optical head 32 is moved in the radial directions A1, A2 of the magneto-optical disc M by the linear motors 20, 20, and gains access to a target track of the magneto-optical disc M by an operation of a control unit 15. The optical head 32 radiates a laser beam onto the magneto-optical disc M through an objective lens 33, when recording information MO on the magneto-optical disc M, and when reproducing information from the magneto-optical disc M. The optical head 32 has a photo detector (not shown) for receiving a laser beam reflected from the magneto-optical disc M to sense the information stored on the magneto-optical disc M when reproducing the information.

The magnetic head unit 40 has a magnetic head carriage 41, which is provided between coils of linear motors (not shown), similarly to the optical head carriage 31. The magnetic head carriage 41 is moved in the radial directions A1, A2 of the magneto-optical disc M, in synchronization with the optical head carriage 31 by an operation of a control unit 15.

The magnetic head carriage 41 has a floating magnetic head 42 and a fixed magnetic head 43 each of which has a different function from the other, as described hereafter. The floating magnetic head 42 and the fixed magnetic head 43 face the surface of the magneto-optical disc M, and are aligned in the radial direction A1 separated from each other by a distance L1. In other words, the floating magnetic head 42 and the fixed magnetic head 43 are aligned in the direction in which the magnetic heads 42, 43 are moved.

The floating magnetic head 42 is held on the magnetic head carriage 41 to be movable in a direction B perpendicular to the surface of the magneto-optical disc M, so that the floating magnetic head 42 approaches or moves away from the magneto-optical disc M. The floating magnetic head 42 floats slightly above the surface of the magneto-optical disc M due to an air flow generated by the rotation of the magneto-optical disc M, when the floating magnetic head 42 approaches the magneto-optical disc M. Then, the floating magnetic head 42 applies a modulated magnetic field onto a portion of the magneto-optical disc M which corresponds to a portion where a laser beam outputted from the optical head 32 is radiated, so that information is overwritten on the magneto-optical disc M with high density. This floating magnetic head 42 is used for a 5.25 inch diameter single side type disc which is constructed in such a manner that information can be overwritten on one surface of the disc. In the overwriting operation, the floating magnetic head 42 is located at a position corresponding to a position at which the objective lens 33 of the optical head 32 is located, as shown in FIG. 1.

The fixed magnetic head 43 is fixed on the magnetic head carriage 41, so that the fixed magnetic head 43 applies a bias magnetic field to the magneto-optical disc M to record information thereon. The fixed magnetic head 43 is used for a 5.25 inch diameter double sided type disc which is constructed in such a manner that information can be recorded after erasing information which has been recorded on the disc. In this recording operation, the fixed magnetic head 43 is located at a position corresponding to a position at which the objective lens 33 of the optical head 32 is located, as shown in FIG. 2.

An optical system and a sensing system, which are provided for moving the floating magnetic head 42 and the fixed magnetic head 43 in synchronization with the optical head 32, are described below.

A light source 51 radiates a luminous flux in a direction perpendicular to a side face 31A of the optical head carriage 31, i.e., in the radial direction A1. The light source 51 has a radiating portion which generates a laser beam, and a lens which converts the laser beam radiated from the radiating portion into a parallel beam, the radiating portion and the lens not being shown.

A beam splitter 52 splits the luminous flux outputted from the light source 51 into a luminous flux advancing in a straight direction and a luminous flux advancing in a direction perpendicular to the straight direction, and radiates the luminous flux advancing in the straight direction onto the side face 31A of the optical head carriage 31.

An optical head reflecting mirror 34 is attached to the side face 31A of the optical head carriage 31. The luminous flux advancing in the straight direction from the beam splitter 52 enters the optical head reflecting mirror 31. The mirror plane of the optical head reflecting mirror 34 is inclined by an angle $\alpha/2$ with respect to a face perpendicular to the luminous flux entering the mirror, so that the optical head reflecting mirror 34 reflects the luminous flux at an angle $\alpha$.

An optical head photo detector 61 receives the luminous flux which is reflected by the optical head reflecting mirror 34 and is converged by a condenser lens 53, and senses a central position of the distribution of the luminous flux received by the optical head photo detector 61. Namely, the optical head photo detector 61 is a PSD (Position Sensitive Device) which senses the position of the luminous flux entering a beam receiving face 61A of the optical head photo detector 61. The beam receiving face 61A is inclined by an angle $\alpha/2$ with respect to the mirror plane of the optical head reflecting mirror 34.

Figure 3:
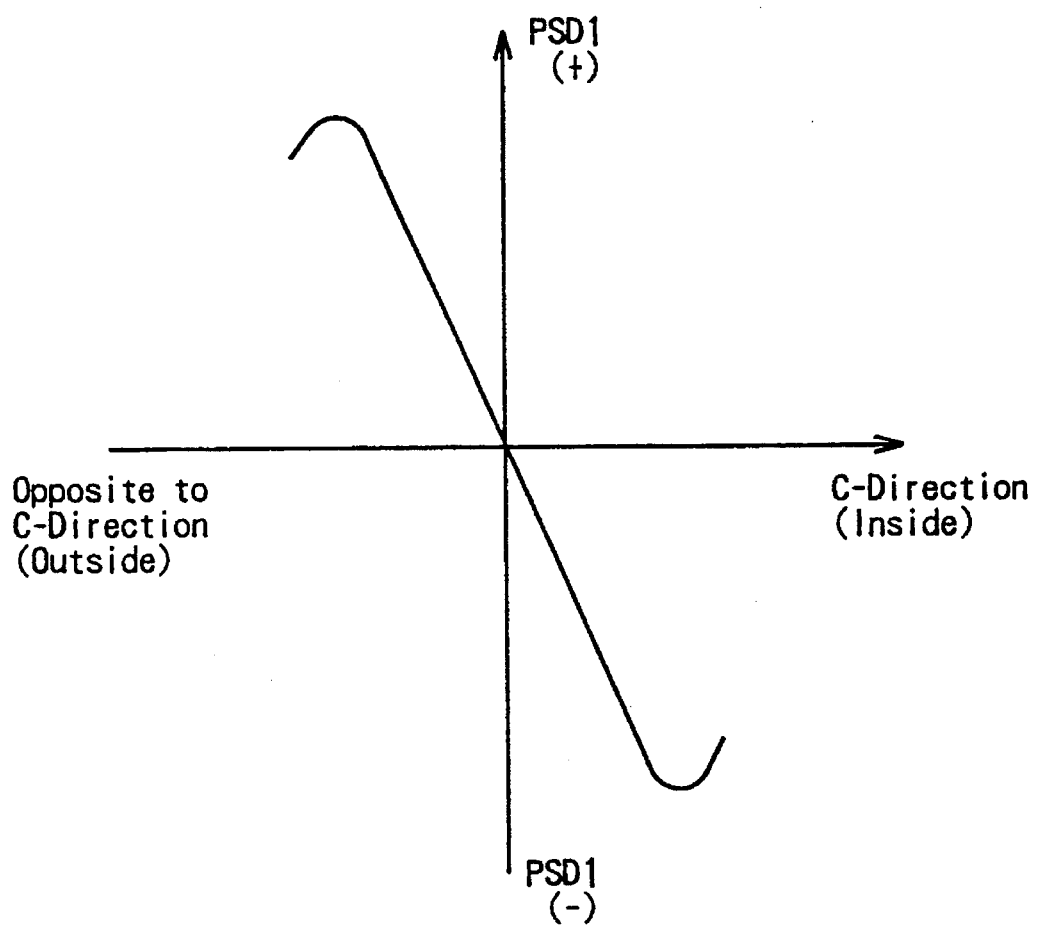
FIG. 3 is a diagram showing the characteristics of an optical head photo detector and a magnetic head photo detector.
Figure 4:
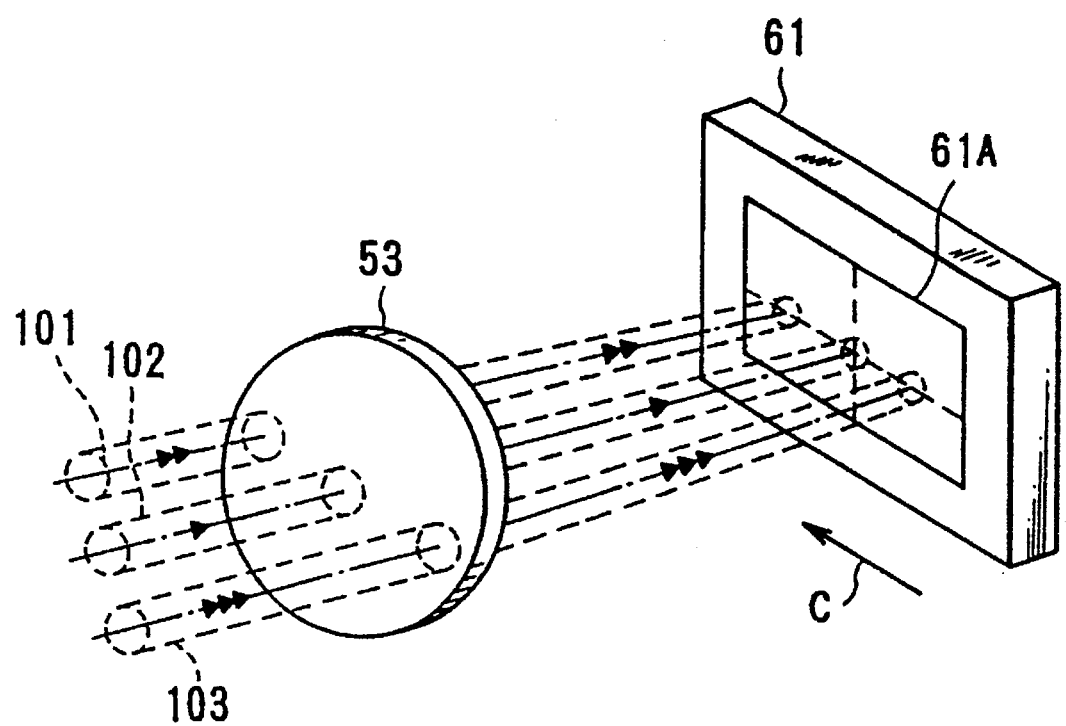
FIG. 4 is a perspective view showing the optical head photo detector.

The characteristics of the optical head photo detector 61 form an S-shaped curve as shown in FIG. 3. Namely, when the luminous flux passing through the condenser lens 53 is moved in the longitudinal direction C of the beam receiving face 61A and enters into the condenser lens 53 as the luminous flux 101, as shown in FIG. 4, an output PSD1 of the optical head photo detector 61 takes on a negative value as shown in FIG. 3. When the luminous flux passing through the condenser lens 53 enters into the center of the beam receiving face 61A as the luminous flux 102, as shown in FIG. 4, the output PSD1 becomes zero as shown in FIG. 3. When the luminous flux passing through the condenser lens 53 is moved in the opposite direction of the direction C and enters into the condenser lens 53 as the luminous flux 103, as shown in FIG. 4 the output PSD1 becomes a positive value, as shown in FIG. 3. Thus, the optical head photo detector 61 generates the output PSD1 corresponding to the position of the luminous flux entering the beam receiving face 61A.

Note, in the first embodiment, when the optical head 32 is positioned near the center of the magneto-optical disc M, the luminous flux reflected by the optical head reflecting mirror 34 is moved in the direction C, as the luminous flux 101, in FIG. 4. When the optical head 32 is positioned in the middle of the recording portion of the magneto-optical disc M, the luminous flux enters the center of the beam receiving face 61A of the optical head photo detector 61 as the luminous flux 102 in FIG. 4. When the optical head 32 is positioned near the edge of the magneto-optical disc M, the luminous flux is moved in the opposite direction of the direction C as the luminous flux 103 in FIG. 4.

A rectangular prism 54 reflects the luminous flux reflected by the beam splitter 52 to a side face 41B of the magnetic head carriage 41.

A magnetic head reflecting mirror 44 is fixed on the side face 41A of the magnetic head carriage 41, similarly to the optical head relfecting mirror 34. The mirror plane of the optical head reflecting mirror 34 is inclined so that the luminous flux reflected from the rectangular prism 54 is reflected by an angle α.

A magnetic head photo detector 62 receives the luminous flux which is reflected by the magnetic head reflecting mirror 44 and is converged by a condenser lens 55, and senses a position of the luminous flux received by the optical head photo detector 62. Namely, the magnetic head photo detector 62 is also a PSD (Position Sensitive Device) as is the optical head photo detector 61. The beam receiving face 62A of the magnetic head photo detector 62 is parallel to the beam receiving face 61A of the optical head photo detector 61. The magnetic head photo detector 62 generates an output PSD2 which is a signal similar to that outputted by the optical head photo detector 61. Namely, the characteristics of the magnetic head photo detector 62 are the same as those of the optical head photo detector 61 shown in FIG. 3.

Note, in the first embodiment, when the floating magnetic head 42 is positioned in the middle between the outermost and the innermost tracks of the magneto-optical disc M, the luminous flux reflected from the magnetic head reflecting mirror 44 enters the center portion of the beam receiving face 62A of the magnetic head photo detector 62, similarly to the luminous flux 102 shown in FIG. 4.

A sensing circuit 63 obtains a relative position error signal E based on the difference between the output PSD1 of the optical head photo detector 61 and the output PSD2 of the magnetic head photo detector 62. The relative position error signal E indicates a positional relationship between the magnetic head unit 40 and the optical head unit 30. The sensing circuit 63 generates the relative position error signal E as follows.

A case in which a single sided type magneto-optical disc is used as the magneto-optical disc M and information is overwritten onto the single sided type magneto-optical disc which has been previously recorded upon is described below.

The sensing circuit 63 generates the relative position error signal E which is zero when the floating magnetic head 42 is located at the same relative position as the optical head 32 (the optimum position), and the sensing circuit 63 generates the relative position error signal E which is not zero when the floating magnetic head 42 is not located at the same relative position as the optical head 32.

Figure 5A:
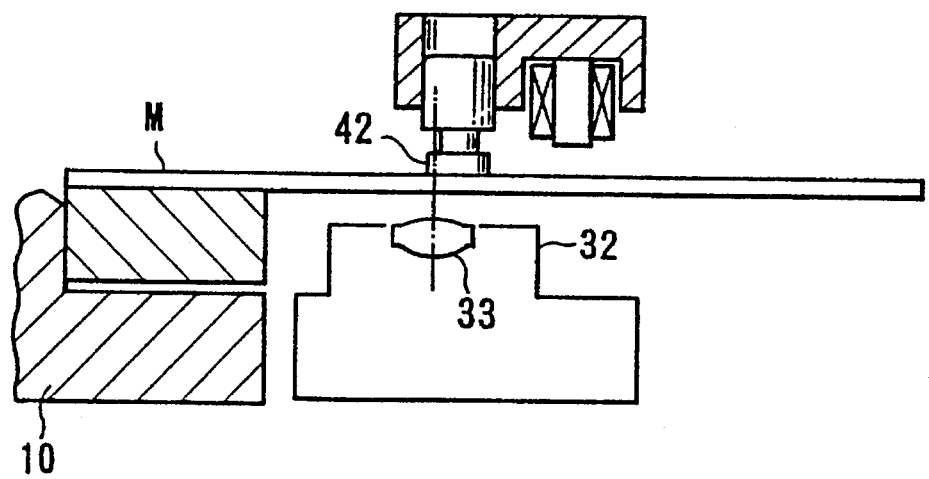
FIG. 5A is a sectional view showing a state in which a floating magnetic head and an optical head unit are located at the innermost position of a magneto-optical disc.
Figure 5B:
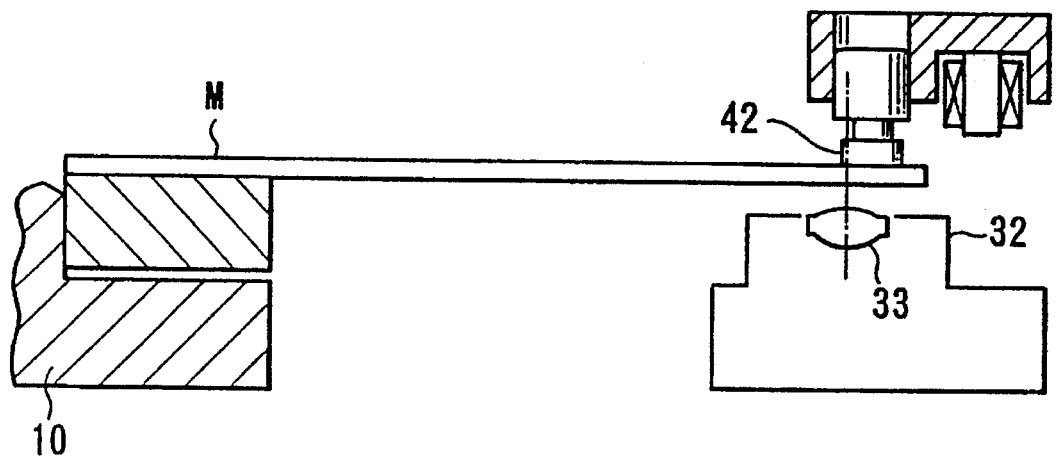
FIG. 5B is a sectional view showing a state in which the floating magnetic head and the optical head unit are located at the outermost position of a magneto-optical disc.

If the position of the floating magnetic head 42 is offset from the optical head 32, the relative position error signal E comes to have a positive value or a negative value. The control unit 15 controls a movement of the floating magnetic head 42, based on the relative position error signal E, in such a manner that the floating magnetic head 42 moves synchronously with the optical head 32. As a result, the floating magnetic head 42 is moved from the innermost position of the magneto-optical disc M which is shown in FIG. 5A to the outermost position of the magneto-optical disc M which is shown in FIG. 5B, so that the floating magnetic head 42 is moved while maintaining a predetermined positional relationship with the optical head 32, i.e., at the same relative position as the optical head 32.

A case in which a double sided type magneto-optical disc is used as the magneto-optical disc M and information is recorded on the double sided type magneto-optical disc is described below.

The output PSD1 corresponding to a position of the optical head unit 30 is zero when the optical head 32 is located at the radial middle portion of the magneto-optical disc M.

Figure 6:
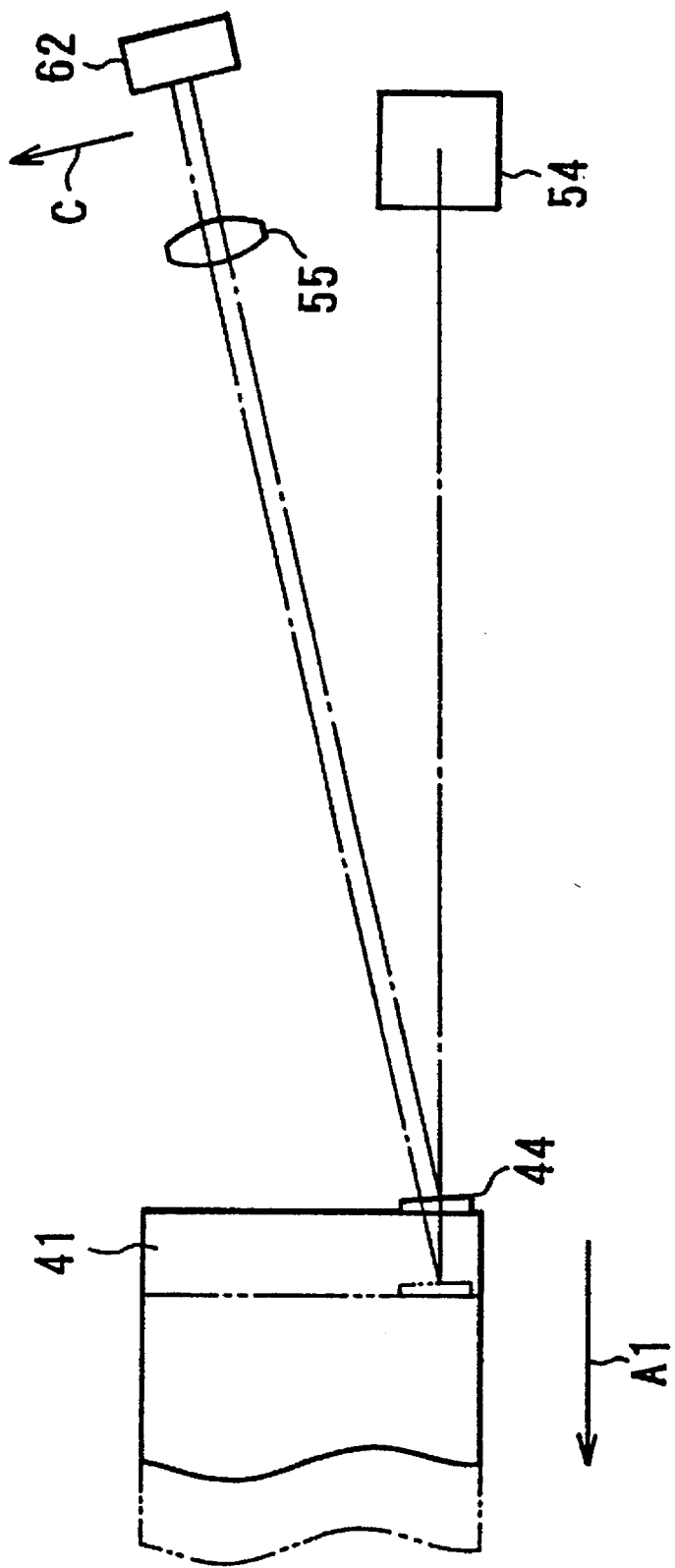
FIG. 6 is a view showing a change of luminous flux reflected by a magnetic head reflecting mirror when a magnetic head carriage is moved.

On the other hand, the control unit 15 controls the fixed magnetic head 43 to move in the radial direction A1 so that the fixed magnetic head 43 faces the optical head 32. When the fixed magnetic head 43 faces the optical head 32, the output PSD2 outputted from the magnetic head photo detector 62 has a negative value. This is because the magnetic head photo detector 62 is disposed in such a manner that, when the floating magnetic head 42 faces the optical head 32, the magnetic head photo detector 62 generates the output PSD2 which is zero. Therefore, as shown in FIG. 6, when the fixed magnetic head 43 is moved in the direction A1 to face the optical head 32, and thus the luminous flux reflected by the magnetic head reflecting mirror 44 is moved in the direction C, the magnetic head photo detector 62 generates the output PSD2 having a predetermined negative value.

At this time, the sensing circuit 63 adds a predetermined offset value corresponding to the distance L1 to the output PSD2 outputted by the magnetic head photo detector 62, so that the output PSD2 becomes zero, whereby the relative position error signal E is adjusted to zero.

Figure 7A:
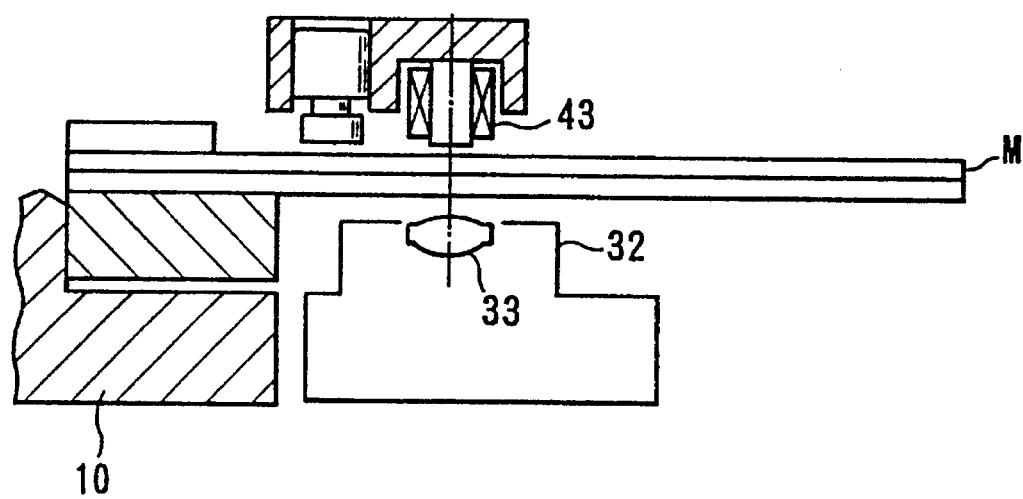
FIG. 7A is a sectional view showing a state in which a fixed magnetic head and an optical head unit are located at the innermost position of a magneto-optical disc.
Figure 7B:
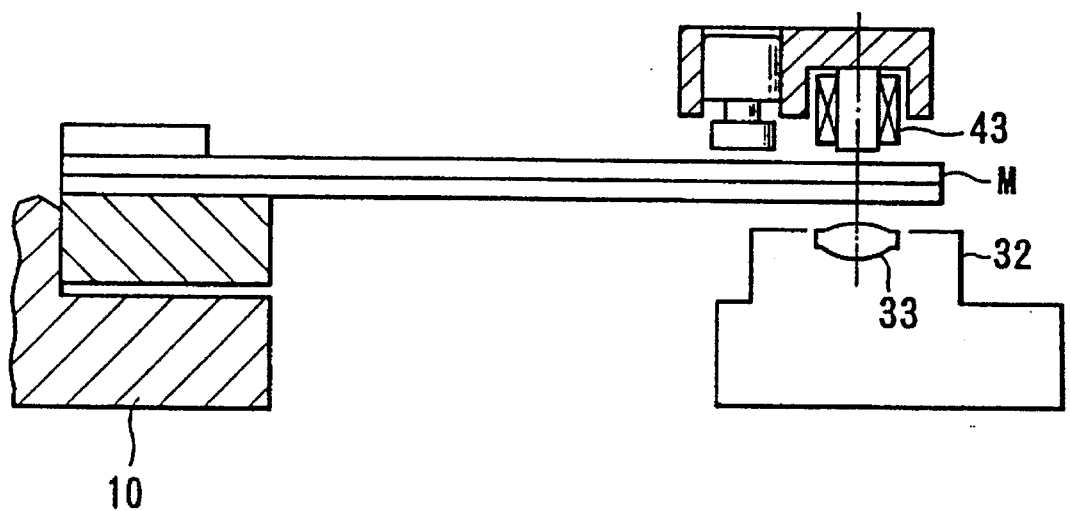
FIG. 7B is a sectional view showing a state in which the fixed magnetic head and the optical head unit are located at the outermost position of a magneto-optical disc.

The control unit 15 controls the fixed magnetic head 43, based on the relative position error signal E which has been adjusted to zero by adding the offset, so that the fixed magnetic head 43 moves synchronously with the optical head 32. As a result, the fixed magnetic head 43 is moved from the innermost position of the magneto-optical disc M which is shown in FIG. 7A, to the outermost position of the magneto-optical disc M which is shown in FIG. 7B, so that the fixed magnetic head 43 is moved while maintaining a predetermined positional relationship with the optical head 32, i.e.. at the same relative position as the optical head 32.

Note, in the first embodiment, the light source 51, the beam splitter 52, the condenser lenses 53, 55, and the rectangular prism 54 form a radiating mechanism which radiates luminous flux to the optical head unit 30 and the magnetic head unit 40. The optical head photo detector 61, the magnetic head photo detector 62, and the sensing circuit 63 form a sensing mechanism which generates the relative position error signal.

With reference to FIGS. 8 through 15, examples of constructions for sensing the kind of magneto-optical disc M and controlling the position of the magnetic head carriage 41 in the first embodiment are described below.

Figure 8:
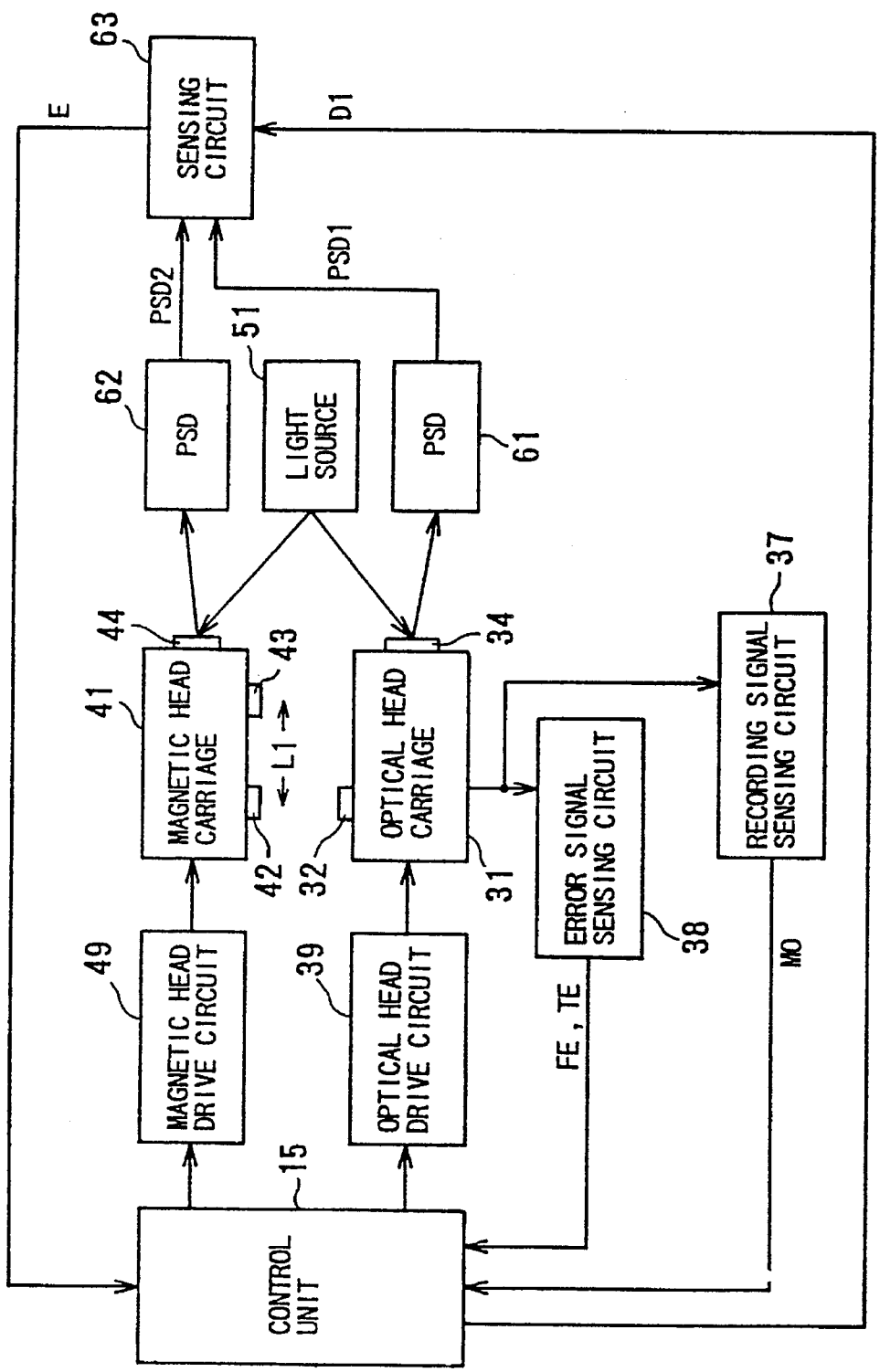
FIG. 8 is a block diagram showing a magneto-optical recording-reproduction device in which position control of a magnetic head unit according to a first example is carried out.

FIG. 8 is a block diagram showing the magneto-optical recording-reproduction device in which a position control of the magnetic head unit 40 according to a first example is carried out. Regarding FIG. 8, only components which have not been described above are described below. A magnetic head drive circuit 49 and an optical head drive circuit 39 are controlled by the control unit 15 to move the magnetic head carriage 41 and the optical head carriage 31 in the radial direction of the magneto-optical disc M, respectively. An error signal sensing circuit 38 is provided for sensing a focusing error signal FE and a tracking error signal TE according to a known process, to output the signals FE and TE into the control unit 15, so that the position of the objective lens 33 is controlled. A recording signal sensing circuit 37 senses information MO recorded on the magneto-optical disc M through the optical head 32, and outputs the information MO into the control unit 15.

As described later, the control unit 15 detects disc information DI, and outputs the disc information DI to the sensing circuit 63, which obtains the relative position error signal E in accordance with the disc information DI. The sensing circuit 63 outputs the relative position error signal E to the control unit 15, so that the position of the magnetic head carriage 41 is controlled.

Figure 9:
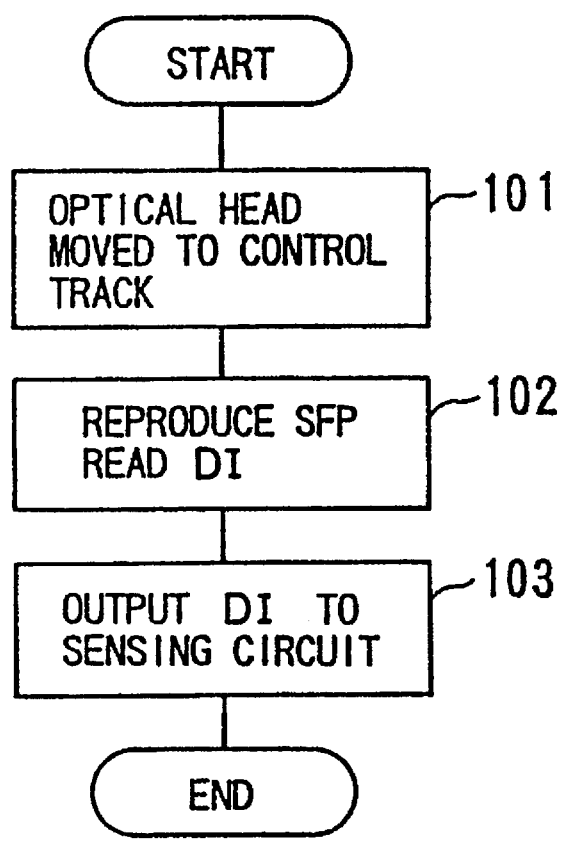
FIG. 9 is a flowchart showing an operation of a control unit in the first example.

FIG. 9 is a flowchart showing an operation of the control unit 15 in the first example, in which information indicating whether the magneto-optical disc M is a single sided type magneto-optical disc or a double sided type magneto-optical disc is recorded in an SFP (Standard Format Part) of a control track which is located at the innermost or the outermost portion of the magneto-optical disc M.

In Step 101, the optical head 32 is moved and positioned at the control track of the magneto-optical disc M. Then, in Step 102, the information MO recorded in the SPF of the control track is reproduced by the recording signal sensing circuit 37 to read the disc information DI, so that it is determined whether the magneto-optical disc M is a single side type magneto-optical disc or double sided type magneto-optical disc. In Step 103, the disc information DI is outputted to the sensing circuit 63, and the process is ended.

Figure 10:
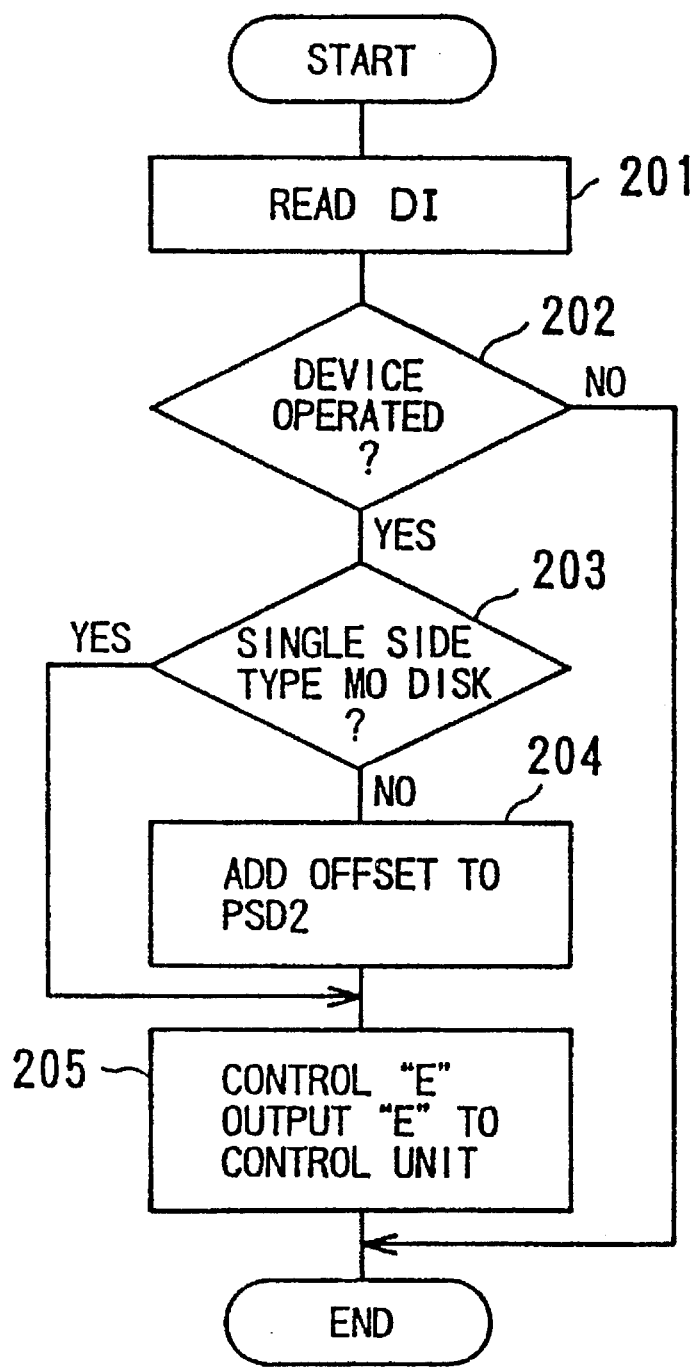
FIG. 10 is a flowchart showing an operation of a sensing circuit in the first example.

FIG. 10 is a flowchart showing an operation of the sensing circuit 63 in the first example.

In Step 201, the disc information DI inputted from the control unit 15 is read. In Step 202, it is determined whether or not the magneto-optical recording-reproduction device is being operated, namely, whether or not the spindle motor 10 is being rotated, for example. When the magneto-optical recording-reproduction device is being operated, the process goes to Step 203 to control the magnetic head unit 40. Conversely, when the magneto-optical recording-reproduction device is not being operated, the process is ended.

In Step 203, it is determined whether or not the magneto-optical disc M is a single side type magneto-optical disc on which information can be overwritten. When the magneto-optical disc M is not a single sided type magneto-optical disc, namely, when the magneto-optical disc M is a double sided type magneto-optical disc, a predetermined offset value corresponding to the distance L1 is added to the output PSD2 outputted by the magnetic head photo detector 62. Conversely, when the magneto-optical disc M is a single sided type magneto-optical disc, Step 204 is skipped, and thus the process goes to Step 205, in which the relative position error signal E is controlled to be zero. The zero signal E is outputted to the control unit 15, whereby the the floating magnetic head 42 or the fixed magnetic head 43 is moved synchronously with the optical head 32.

Figure 11:
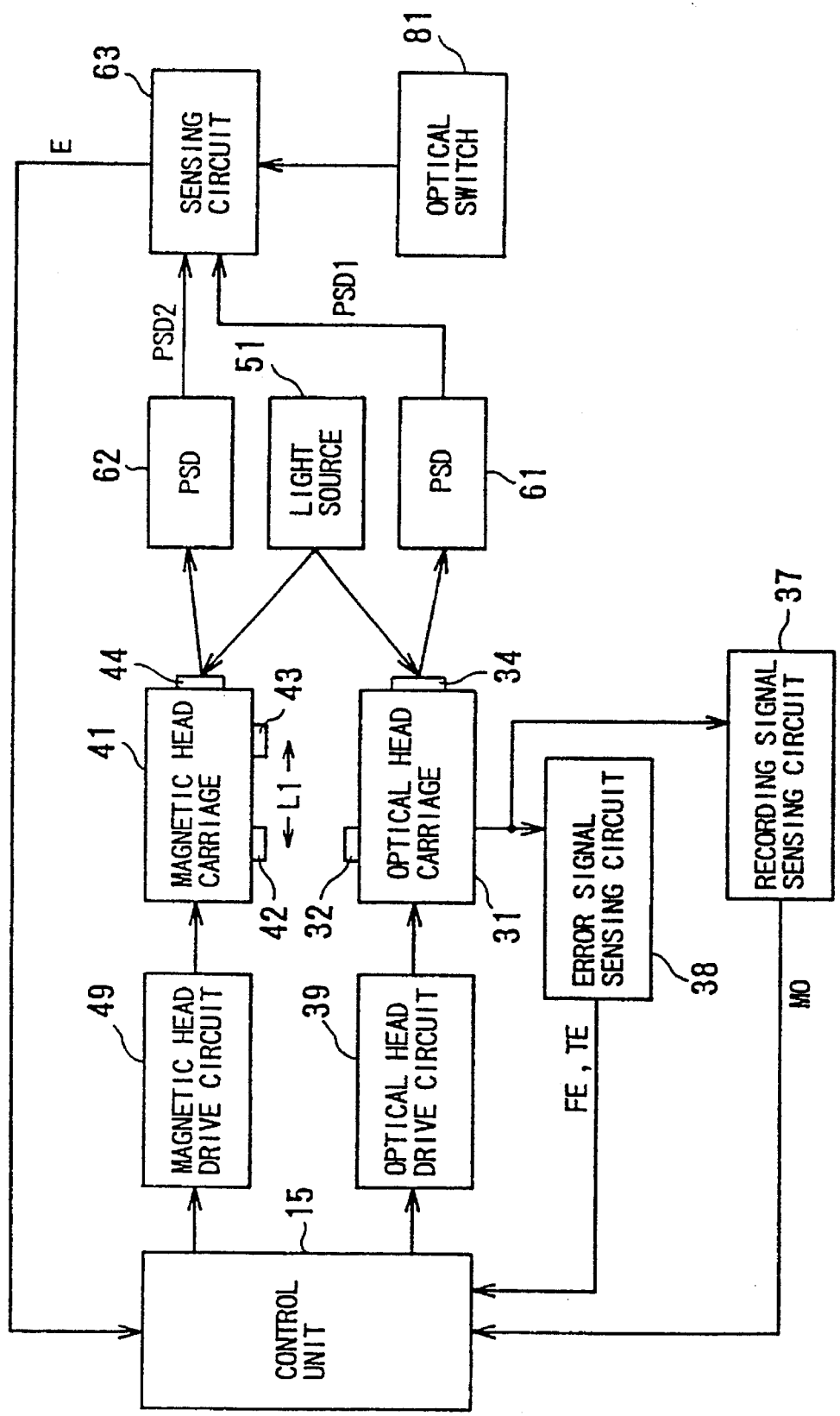
FIG. 11 is a block diagram showing a magneto-optical recording-reproduction device in which a position control of a magnetic head unit according to a second example is carried out.
Figure 12:
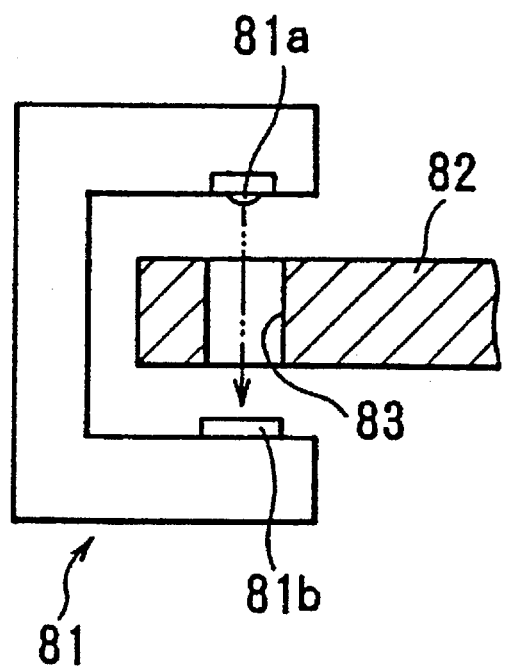
FIG. 12 is a sectional view showing an optical switch.

FIG. 11 is a block diagram showing the magneto-optical recording-reproduction device in which a position control of the magnetic head unit 40 according to a second example is carried out. In the second example, as shown in FIG. 12, the magneto-optical recording-reproduction device has an optical switch or photo interrupter 81. A cartridge 82 in which the magneto-optical disc M of the single sided type magneto-optical disc is housed is provided with a hole 83, which is detected by the optical switch 81. Namely, when a light radiated by a light emitting diode 81a is sensed by a photocell 81b, the optical switch 81 is turned ON to output a signal indicating the magneto-optical disc M is a single side type magneto-optical disc, and when a light radiated by the light emitting diode 81a is interrupted by the cartridge 82, the optical switch 81 is turned OFF.

Figure 13:
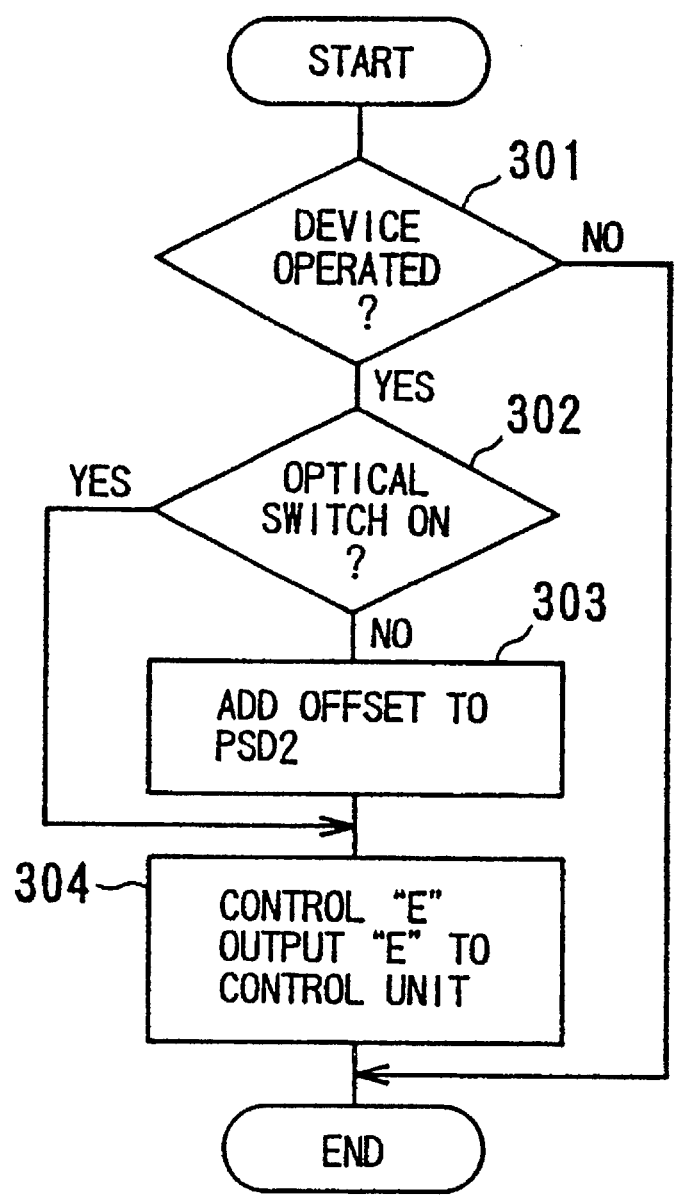
FIG. 13 is a flowchart showing an operation of a sensing circuit in the second example.

FIG. 13 is a flowchart showing an operation of the sensing circuit 63 in the second example.

In Step 301, it is determined whether or not the magneto-optical recording-reproduction device is being operated, similarly to Step 202 of FIG. 10. When the magneto-optical recording-reproduction device is being operated, the process goes to Step 302 to control the magnetic head unit 40, and when the magneto-optical recording-reproduction device is not being operated, the process is ended.

In Step 302, it is determined whether the optical switch 81 is turned ON or OFF. When the optical switch 81 is turned OFF which means that the magneto-optical disc M is a double sided type magneto-optical disc, a predetermined offset value corresponding to the distance L1 is added to the output PSD2 in Step 303. Conversely, when the optical switch 81 is turned ON which means that the magneto-optical disc M is a single sided type magneto-optical disc, Step 303 is skipped, and thus the process goes to Step 304 in which the same operation as Step 205 of FIG. 10 is carried out.

Figure 14:
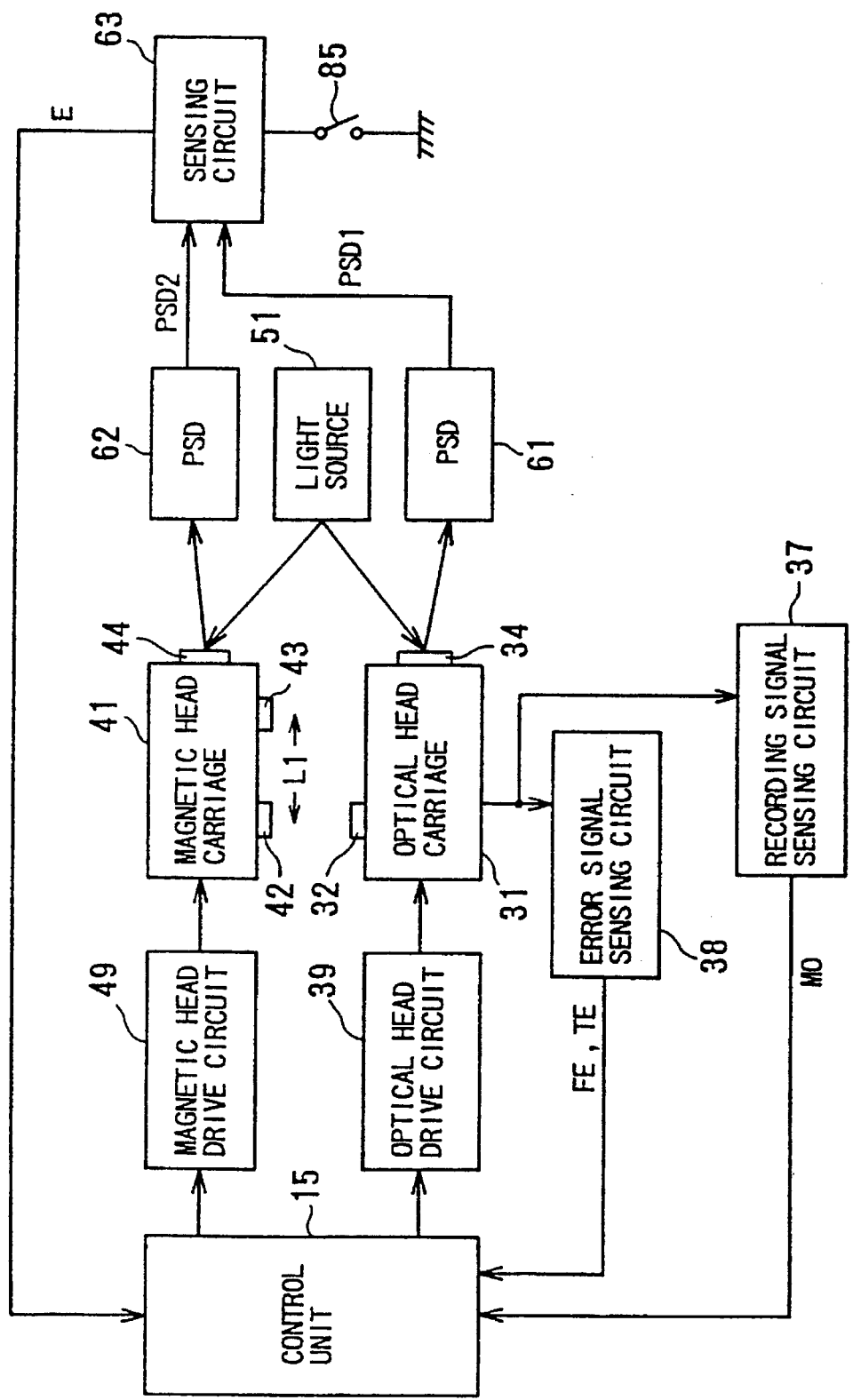
FIG. 14 is a block diagram showing a magneto-optical recording-reproduction device in which a position control of a magnetic head unit according to a third example is carried out.

FIG. 14 is a block diagram showing the magneto-optical recording-reproduction device in which a position control of the magnetic head unit 40 according to a third example is carried out. In the third example, the magneto-optical recording-reproduction device has a select switch 85, which is operated by a user of the magneto-optical recording-reproduction device. The switch 85 is open when the magneto-optical disc M is a single sided type magneto-optical disc, and is closed when the magneto-optical disc M is a double sided type magneto-optical disc.

Figure 15:
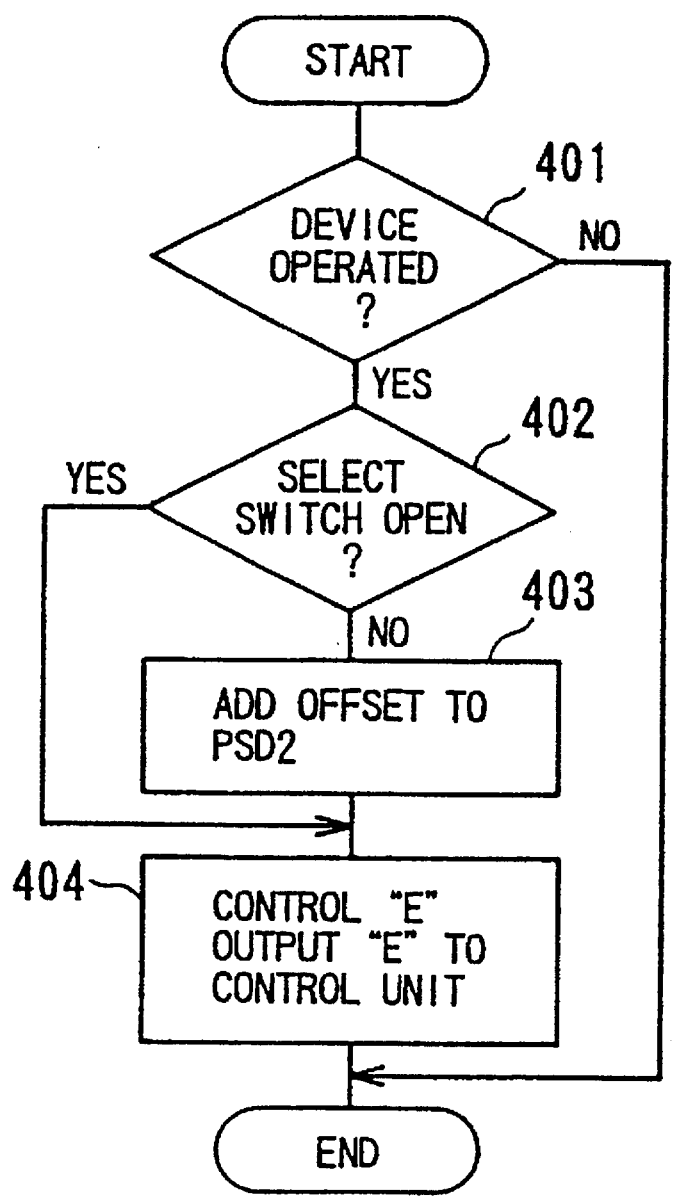
FIG. 15 is a flowchart showing an operation of a sensing circuit in the third example.

FIG. 15 is a flowchart showing an operation of the sensing circuit 63 in the third example.

Steps 401 through 404 correspond to Steps 301 through 304 of FIG. 13, and only Step 402 is different from Step 302. Namely, in Step 402, it is determined whether the select switch 85 is open or closed. When the optical switch 85 is closed which means that the magneto-optical disc M is a double sided type magneto-optical disc, a predetermined offset value corresponding to the distance L1 is added to the output PSD2 in Step 403. Conversely, when the select switch 85 is open which means that the magneto-optical disc M is a single sided type magneto-optical disc, Step 403 is skipped, and thus the process goes to Step 404 in which the same operation as Step 205 of FIG. 10 is carried out.

Thus, according to the first embodiment, information can be overwritten onto a 5.25 inch diameter single sided type magneto-optical disc using the magnetic field modulation method. Further, information can be recorded on a double sided type magneto-optical disc, and information stored on a double sided type magneto-optical disc can be erased.

Figure 16:
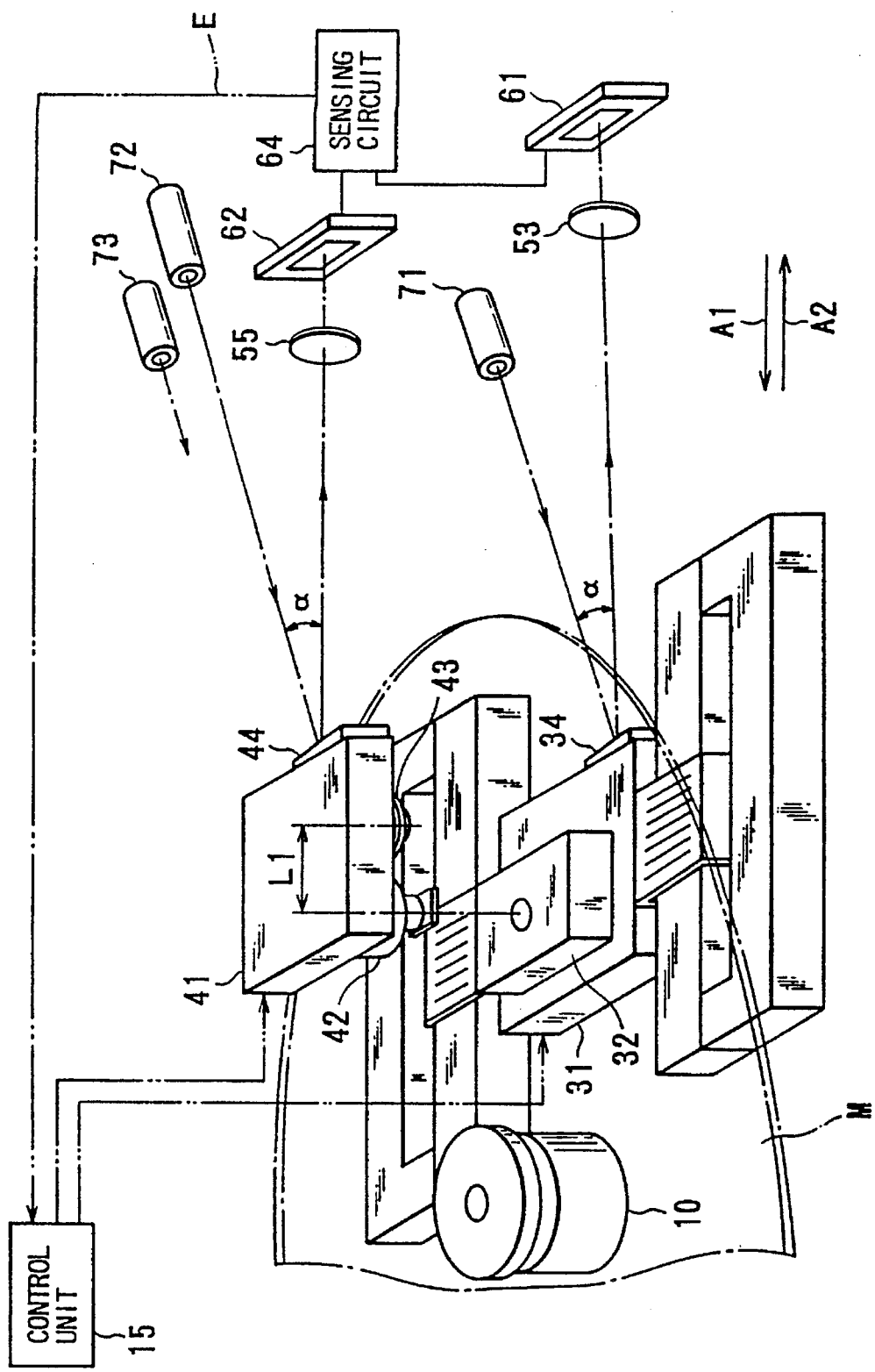
FIG. 16 is a perpendicular view showing a second embodiment in a state in which an overwriting operation is carried out by an optical head and a floating magnetic head.

FIG. 16 shows a second embodiment of the magneto-optical record-reproduction device according to the present invention. In this device, a first light source 71, a second light source 72, and a third light source 73 are provided as the radiating mechanism, and a sensing circuit 64 is provided Instead of the sensing circuit 63 of the first embodiment. Note, in the second embodiment, the same reference numerals are applied to the same or corresponding portions as in the first embodiment, and descriptions of these portions are omitted.

The first light source 71 radiates luminous flux onto the optical head reflecting mirror 34 of the optical head carriage 31, by an angle α with respect to the radial direction A1. The light source 71 has a radiating portion which generates a laser beam and a lens which converts the laser beam radiated from the radiating portion into a parallel beam; the radiating portion, and the lens are not shown.

Figure 17:
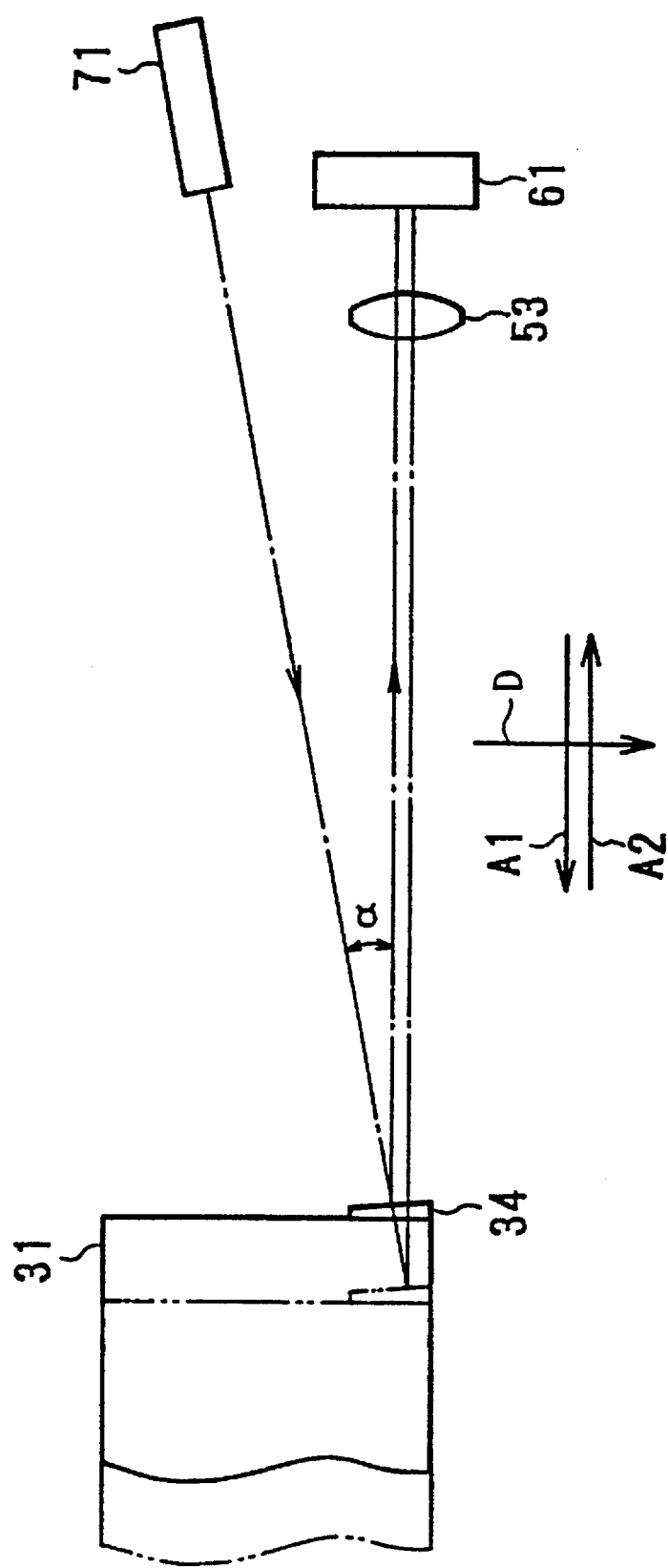
FIG. 17 is a view showing a sensing operation in the second embodiment in which a position of an optical head carriage is sensed.

The luminous flux outputted from the light source 71 is reflected by the optical head reflecting mirror 34 to advance in the radial direction A2, and is converged by the condenser lens 53, to enter into the optical head photo detector 61. When the optical head carriage 31 is moved in the radial direction A1, for example, the position at which the luminous flux enters into the optical head reflecting mirror 34 is moved in the direction D perpendicular to the radial direction A1, as shown in FIG. 17. In accordance with this movement, the optical head photo detector 61 generates an output PSD1, similarly to the first embodiment.

The second light source 72 and the third light source 73 have a similar construction to the first light source 71. The second light source 72 radiates a luminous flux onto the magnetic head reflecting mirror 44 of the magnetic head carriage 41 by an angle α with respect to the radial direction A1, to sense a position of the floating magnetic head 42. The third light source 73 radiates a luminous flux onto the magnetic head reflecting mirror 44 in parallel to the luminous flux of the second light source 72, to sense a position of the fixed magnetic head 43. The second light source 72 and the third light source 73 are disposed at different positions along the radial direction of the disc M, by an amount corresponding to the distance L1.

Figure 18:
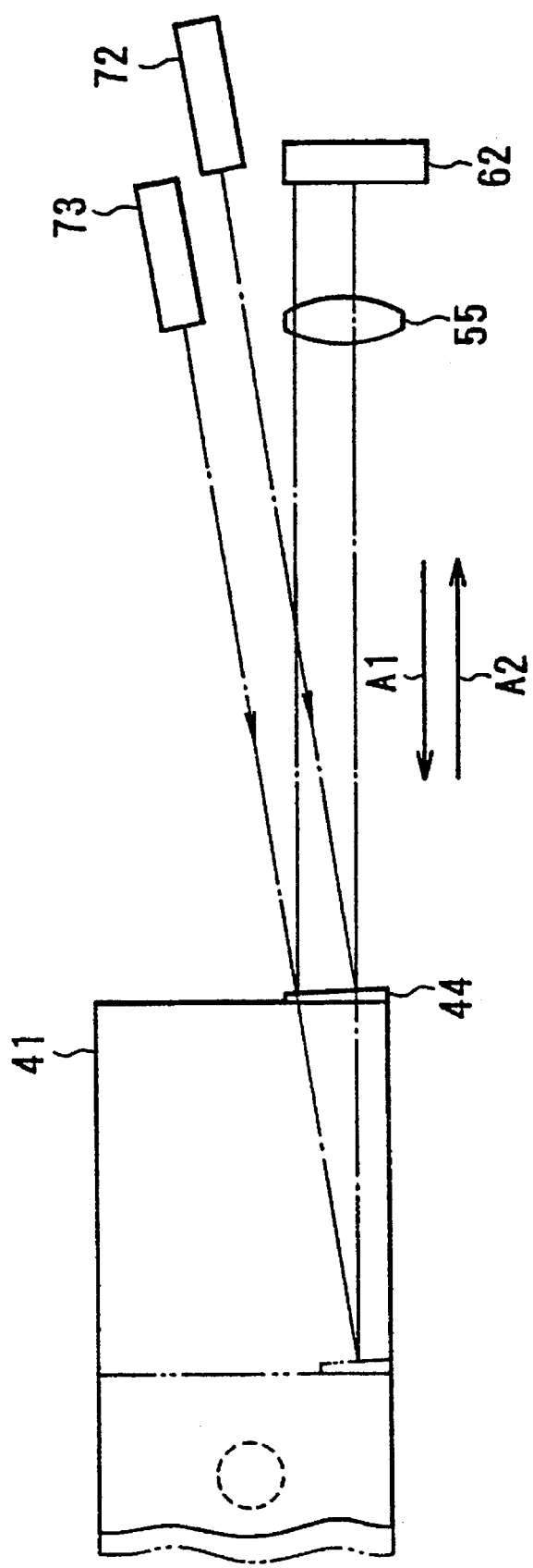
FIG. 18 is a view showing a sensing operation in the second embodiment in which a position of a magnetic head carriage is sensed.

When information is overwritten onto a single sided type magneto-optical disc which has been recorded on, luminous flux outputted by the second light source 72 is radiated to the magnetic head reflecting mirror 44 as shown in FIG. 18. This luminous flux is reflected by the magnetic head reflecting mirror 44 in the radial direction A2, and converged by the condenser lens 55 to enter into the magnetic head photo detector 62, which generates an output PSD2, similarly to the first embodiment.

The sensing circuit 64 obtains a relative position error signal E based on the difference between the output PSD1 of the optical head photo detector 61 and the output PSD2 of the magnetic head photo detector 62. The relative position error signal E is outputted to the control unit 15 so that the floating magnetic head 42 is moved synchronously with the optical head 32.

When information is recorded onto a double sided type magneto-optical discs luminous flux outputted by the third light source 73 is radiated to the magnetic head reflecting mirror 44. At this time, since the luminous flux entering into the magnetic head photo detector 62 is offset from the center of the light receiving area of the magnetic head photo detector 62, the magnetic head photo detector 62 generates an output PSD2 corresponding to the position at which the luminous flux enters, and transmits the output PSD2 to the sensing circuit 64, by which the sensing circuit 64 outputs a relative position error signal E to the control unit 15 based on the output PSD1 and the output PSD2. The control unit 15 controls the magnetic head carriage 41 to be moved in the radial direction A1. Then, when the fixed magnetic head 43 comes to a position where the fixed magnetic head 43 faces the optical head 32, the relative position error signal E becomes zero. The sensing circuit 64 then outputs the relative position error signal E (zero) so that the fixed magnetic head 43 is moved synchronously with the optical head 32.

Note, operations of the second and third light sources 72 and 73 are switched by the sensing circuit 64.

FIGS. 19 through 24 show examples of constructions for sensing the kind of magneto-optical disc M and controlling the position of the magnetic head carriage 41 in the second embodiment.

Figure 19:
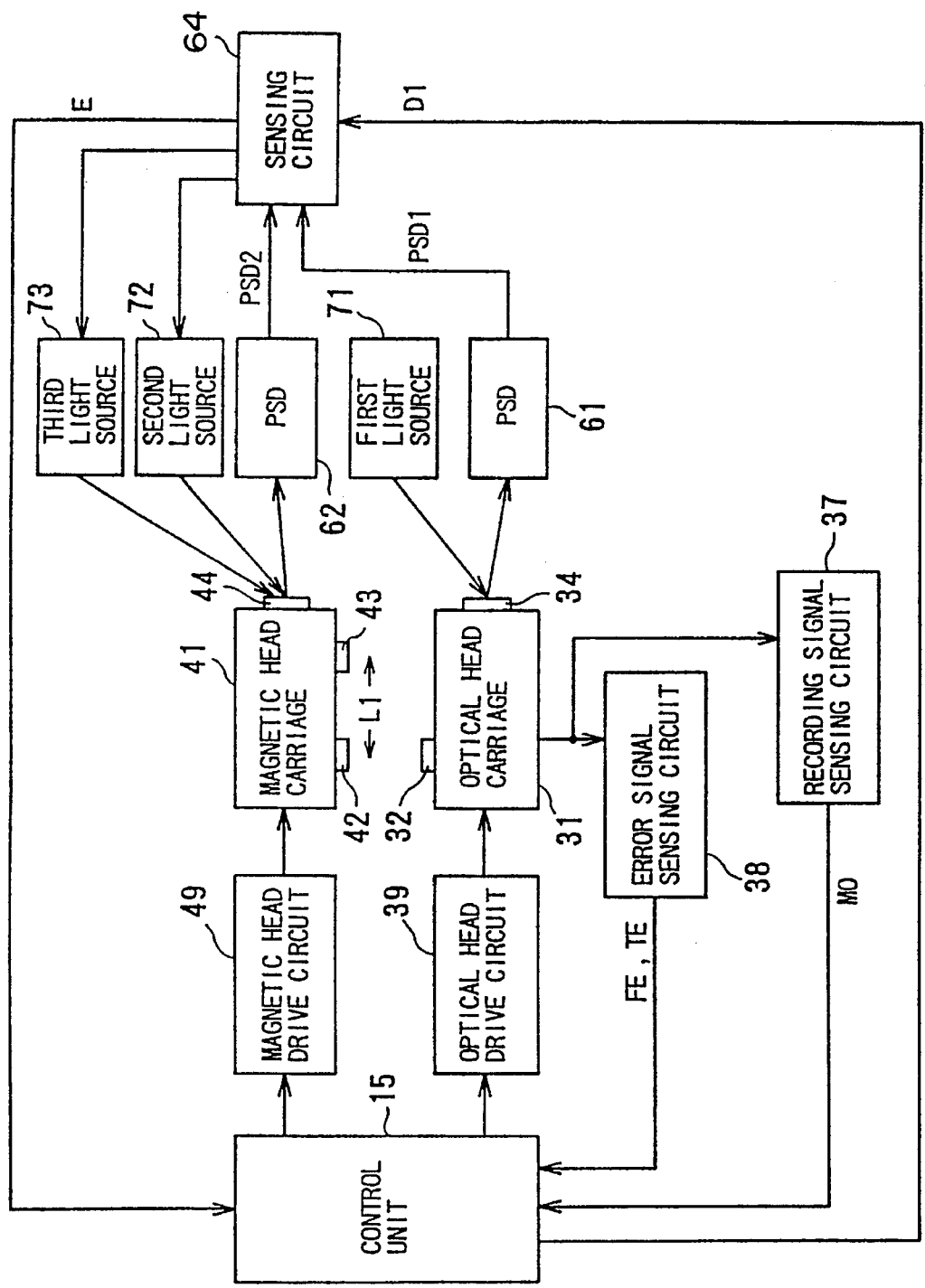
FIG. 19 is a block diagram showing the magneto-optical recording-reproduction device in which a position control of the magnetic head unit according to a first example in the second embodiment is carried out.

FIG. 19 is a block diagram showing the magneto-optical recording-reproduction device in which a position control of the magnetic head unit 40 according to a first example is carried out. In FIG. 19, only the light sources 71, 72 and 73 are different from the light source 51 in FIG. 8, and the other components are the same as those in FIG. 8. Operation of the control unit 15 is also the same as that of FIG. 9.

Figure 20:
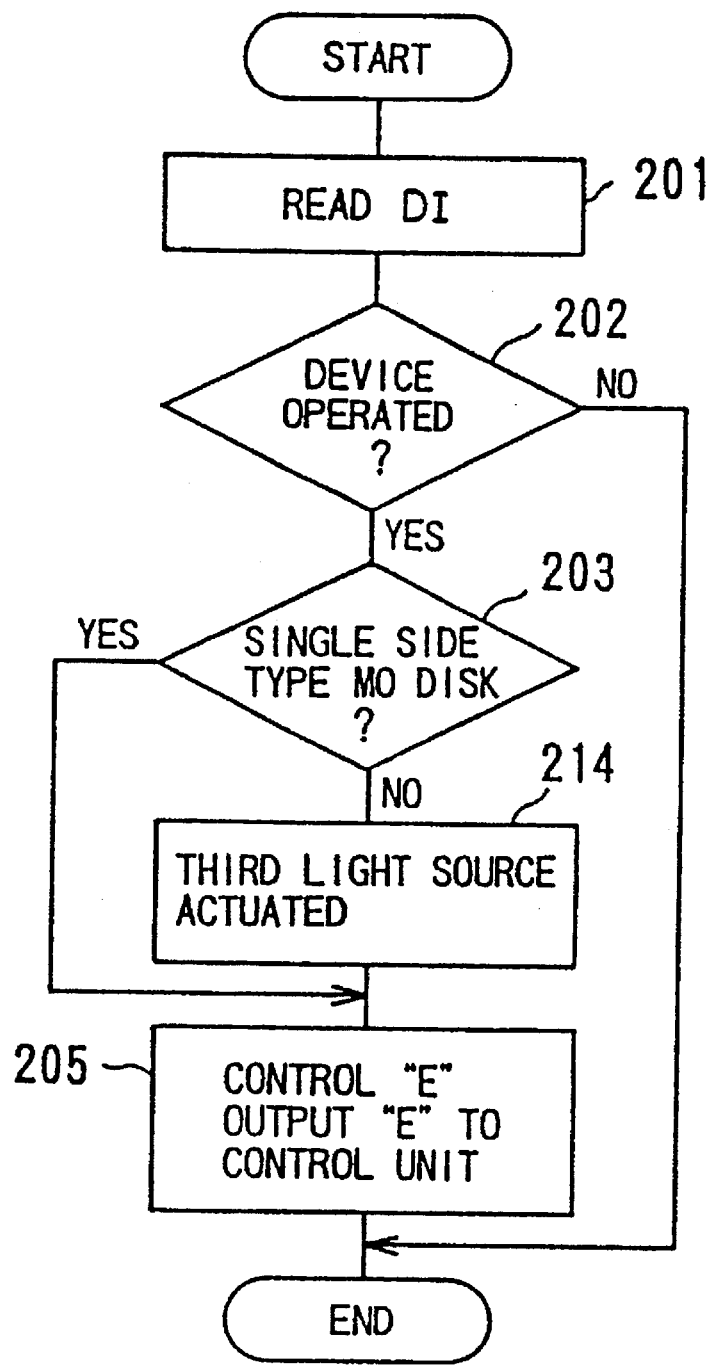
FIG. 20 is a flowchart showing an operation of a sensing circuit in the first example.

Regarding the operation of the sensing circuit 64, as shown in FIG. 20, when it is determined that the magneto-optical disc M is not a single sided type magneto-optical disc, the third light source 73 is actuated in Step 214 and when the magneto-optical disc M is a single sided type magneto-optical disc, Step 214 is skipped, and thus the process goes to Step 205. The other Steps are the same as those shown in FIG. 10.

Figure 21:
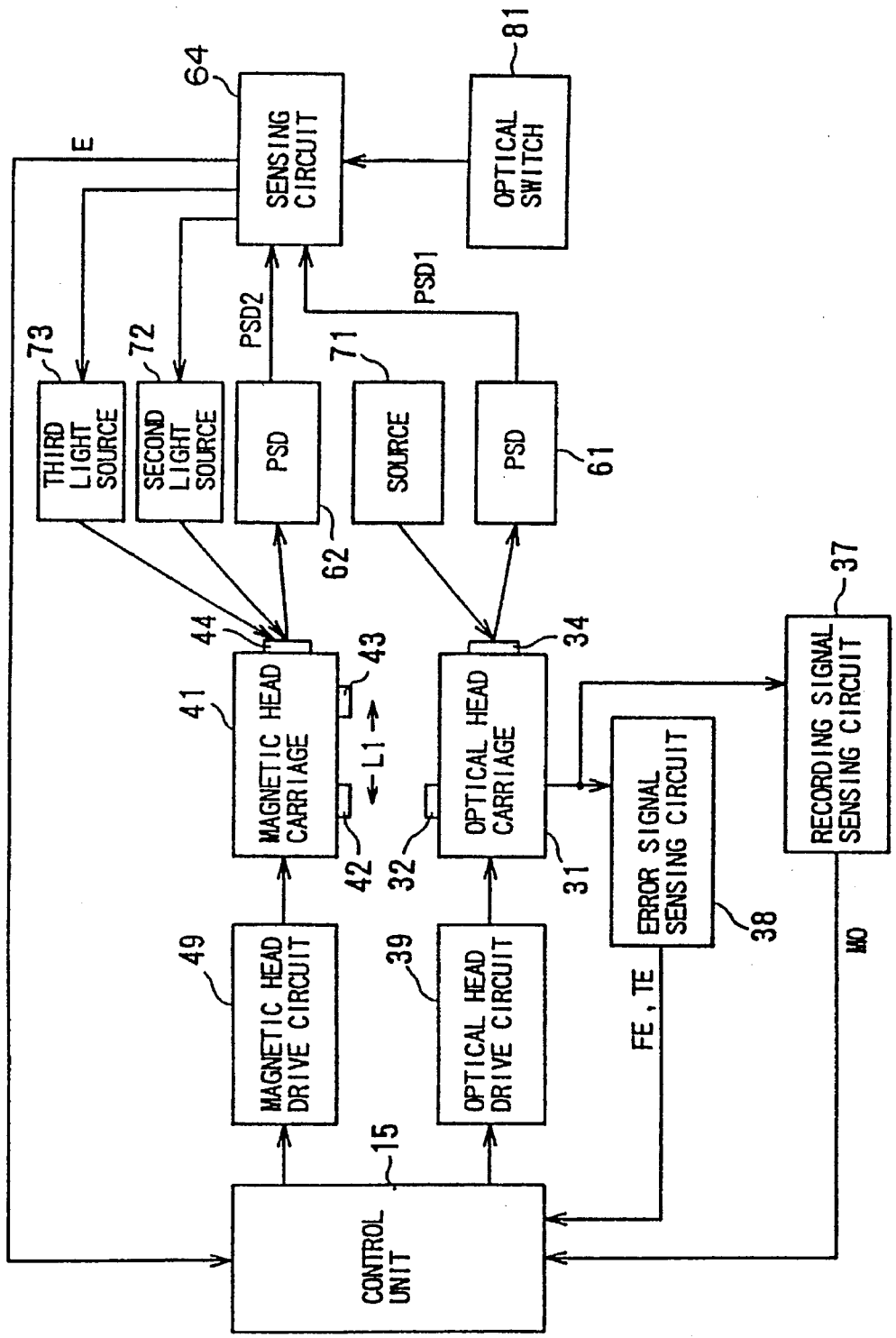
FIG. 21 is a block diagram showing a magneto-optical recording-reproduction device in which a position control of a magnetic head unit according to a second example of the second embodiment is carried out.

FIG. 21 is a block diagram showing the magneto-optical recording-reproduction device in which position control of the magnetic head unit 40 according to a second example is carried out. In the second example, the construction of the magneto-optical recording-reproduction device is the same as that shown in FIG. 11, except that the light sources 71, 72 and 73 are provided.

Figure 22:
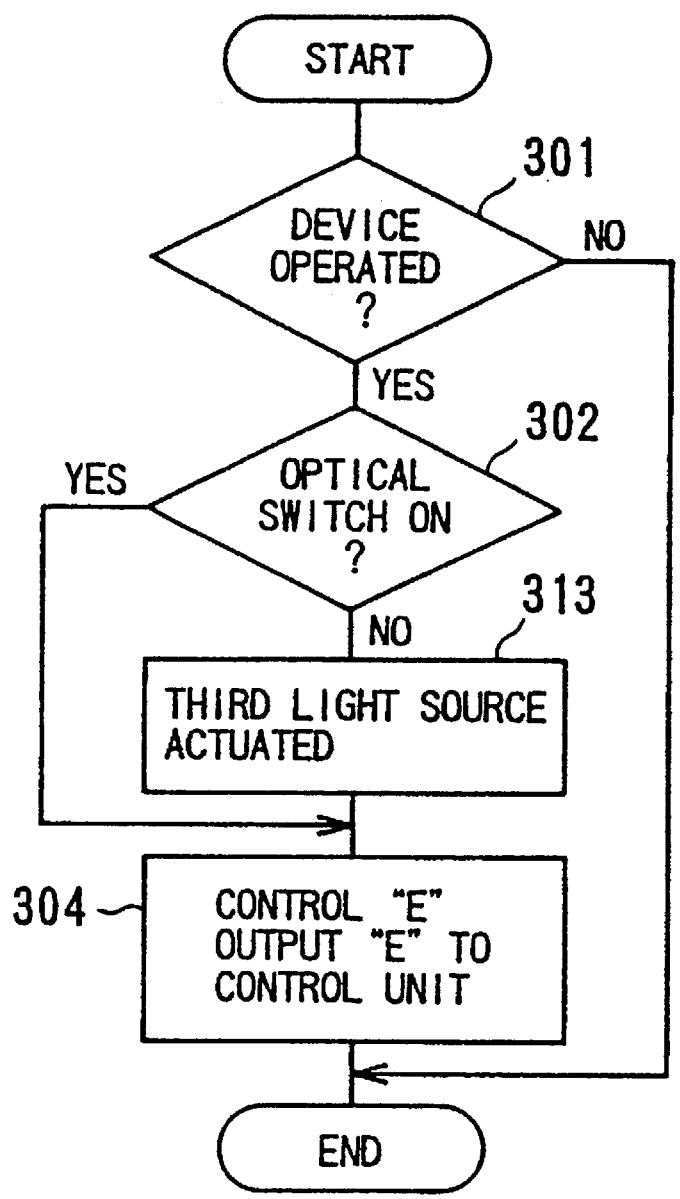
FIG. 22 is a flowchart showing an operation of a sensing circuit in the second example.

In the operation of the sensing circuit 64, as shown in FIG. 22, when it is determined that the optical switch 81 is turned OFF, the third light source 73 is actuated in Step 313, and when the optical switch 81 is turned ON, Step 313 is skipped, and thus the process goes to Step 304. The other Steps are the same as those shown in FIG. 13.

Figure 23:
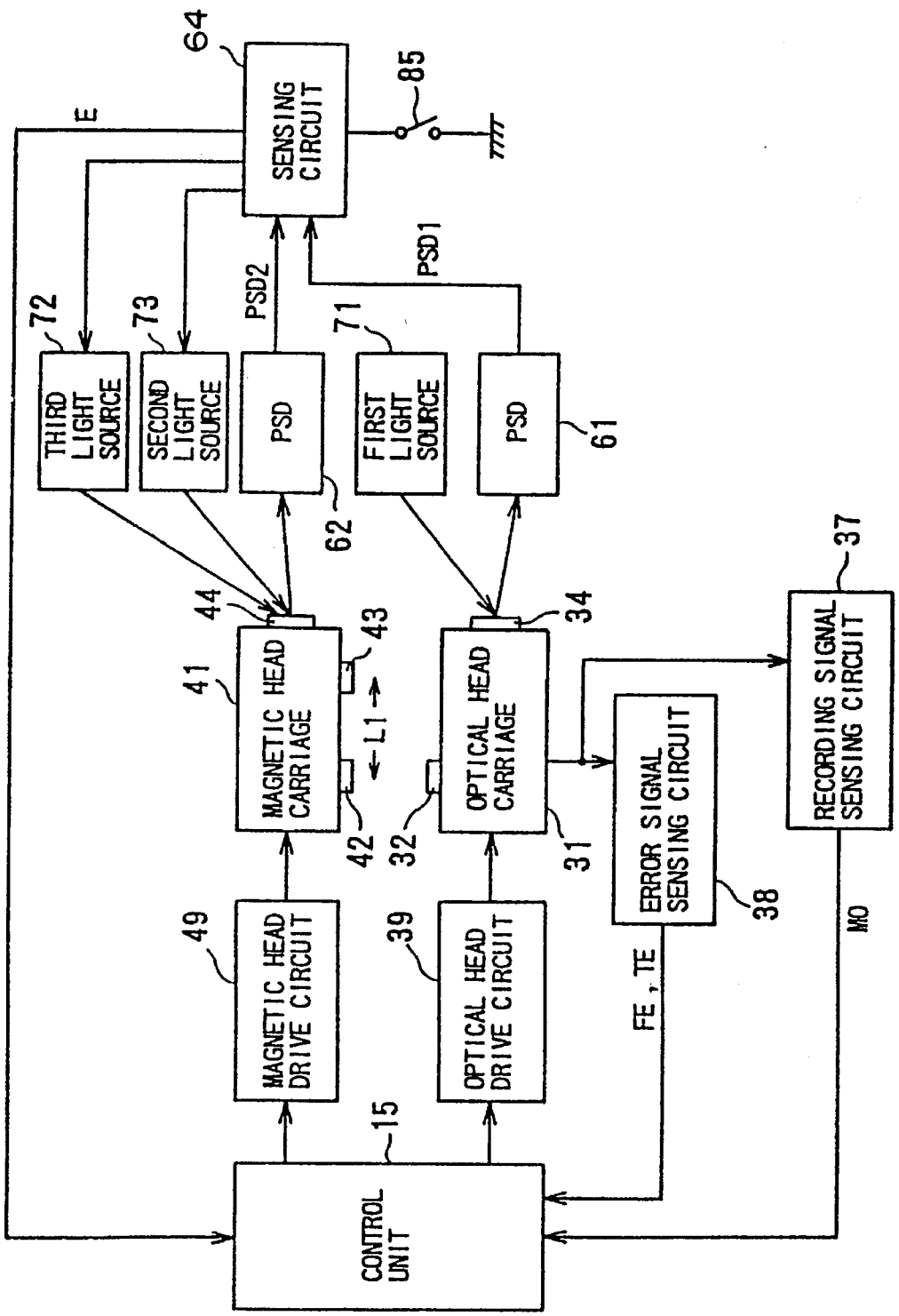
FIG. 23 is a block diagram showing a magneto-optical recording-reproduction device in which a position control of a magnetic head unit according to a third example of the second embodiment is carried out.

FIG. 23 is a block diagram showing the magneto-optical recording-reproduction device in which position control of the magnetic head unit 40 according to a third example is carried out. In the third example, the construction of the magneto-optical recording-reproduction device is the same as that shown in FIG. 14, except that the light sources 71, 72 and 73 are provided.

Figure 24:
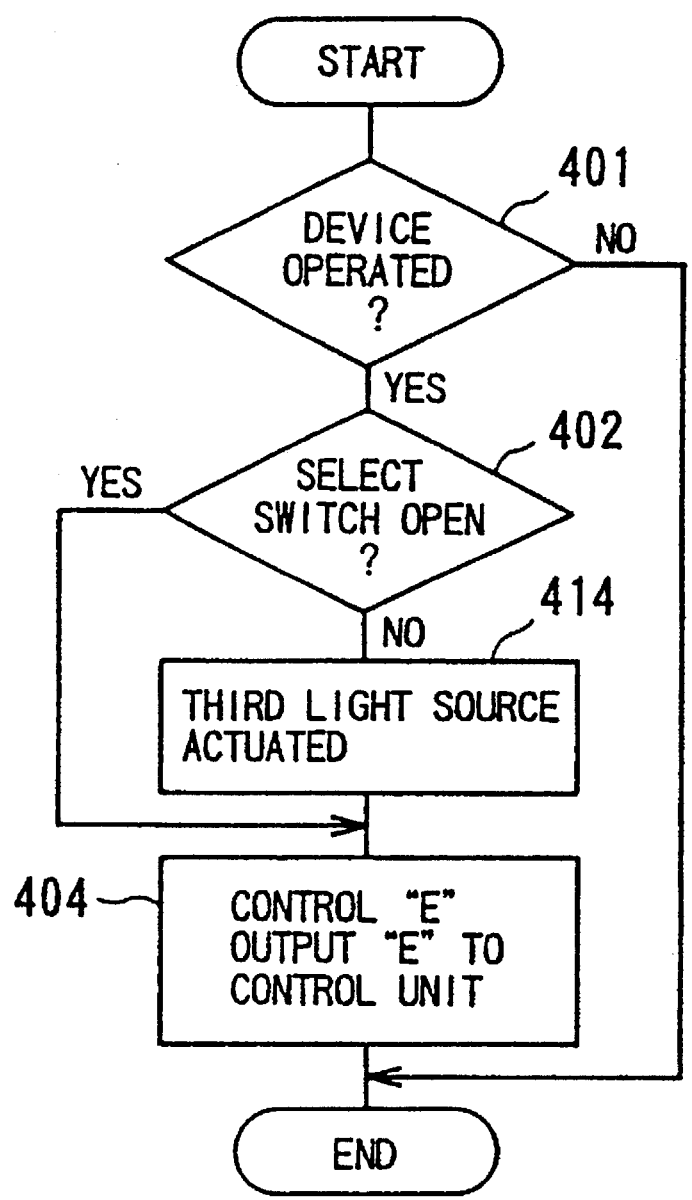
FIG. 24 is a flowchart showing an operation of a sensing circuit in the third example.

In the operation of the sensing circuit 64, as shown in FIG. 24, when it is determined that the select switch 85 is turned OFF, the third light source 73 is actuated in Step 414, and when the select switch 85 is turned ON, Step 414 is skipped, and thus the process goes to Step 404. The other Steps are the same as those shown in FIG. 15.

Thus, according to the second embodiment, the sensing circuit 64 does not impose an offset on the output PSD2 of the magnetic head photo detector 62, but only obtains the difference between the output PSD1 and the output PSD2. Therefore, the construction of the sensing circuit 64 is simpler than the sensing circuit 63 of the first embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 4-86831 (filed on Apr. 8, 1992) which is expressly incorporated herein by reference in its entirety.

I claim:

1. A device for controlling head units provided in a magneto-optical recording device, comprising:

an optical head unit for radiating a laser beam onto a magneto-optical disc, said optical head unit moving relative to said magneto-optical disc;

a magnetic head unit synchronously movable with said optical head unit, and having a first magnetic head and a second magnetic head arranged along a radial direction with respect to said magneto-optical disc;

radiating means for radiating a luminous flux to said optical head unit and said magnetic head unit, said luminous flux being reflected by said optical head unit and said magnetic head unit; and control means for controlling said optical head unit and said magnetic head unit based on said luminous flux reflected from said optical head unit and said magnetic head unit, whereby one of said first and second magnetic heads is moved while maintaining a predetermined positional relationship with respect to said optical head unit;

wherein said radiating means comprises a first light source, a second light source and a third light source, said first light source radiating luminous flux onto said optical head unit, said second light source radiating luminous flux onto said magnetic head unit to sense a position of said first magnetic head by said control means, and said third light source radiating luminous flux onto said magnetic head unit to sense a position of said second magnetic head by said control means.

2. A device according to claim 1, wherein said control means has an optical switch, and determines the type of magneto-optical disc based on a signal outputted by said optical switch sensing a hole provided in a cartridge in which said magneto-optical disc is housed.

3. A device according to claim 1, wherein said control means has a select switch, and determines the type of magneto-optical disc based on a condition of said select switch.

* * * * *